US008566453B1

(12) United States Patent
Araujo et al.

(10) Patent No.: US 8,566,453 B1
(45) Date of Patent: Oct. 22, 2013

(54) COPS-PR ENHANCEMENTS TO SUPPORT FAST STATE SYNCHRONIZATION

(75) Inventors: Wladimir Araujo, Ottawa (CA); Alex Ali, Groton, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 318 days.

(21) Appl. No.: 11/942,217

(22) Filed: Nov. 19, 2007

(51) Int. Cl.
*G06F 15/16* (2006.01)

(52) U.S. Cl.
USPC ........... 709/227; 370/331; 370/392; 370/466; 370/352; 370/328; 370/401; 370/235; 455/445; 709/230; 709/228; 709/238; 709/249; 709/248; 709/203; 709/220; 726/1; 726/12; 712/37

(58) Field of Classification Search
USPC ........................................................ 709/227
See application file for complete search history.

(56) References Cited

U.S. PATENT DOCUMENTS

| | | | | |
|---|---|---|---|---|
| 5,784,636 | A * | 7/1998 | Rupp | 712/37 |
| 6,601,101 | B1 * | 7/2003 | Lee et al. | 709/227 |
| 6,636,491 | B1 * | 10/2003 | Kari et al. | 370/328 |
| 6,813,638 | B1 * | 11/2004 | Sevanto et al. | 709/227 |
| 7,069,337 | B2 * | 6/2006 | Rawlins et al. | 709/238 |
| 7,099,932 | B1 * | 8/2006 | Frenkel et al. | 709/223 |
| 7,165,112 | B2 * | 1/2007 | Battin et al. | 709/230 |
| 7,613,834 | B1 * | 11/2009 | Pallipuram et al. | 709/248 |
| 2002/0194369 | A1 * | 12/2002 | Rawlins et al. | 709/238 |
| 2003/0066065 | A1 * | 4/2003 | Larkin | 717/177 |
| 2004/0083403 | A1 * | 4/2004 | Khosravi | 714/13 |
| 2004/0153551 | A1 * | 8/2004 | Haumont | 709/228 |
| 2004/0225717 | A1 * | 11/2004 | Cuervo | 709/206 |
| 2005/0041584 | A1 * | 2/2005 | Lau et al. | 370/235 |
| 2005/0198306 | A1 * | 9/2005 | Palojarvi et al. | 709/227 |
| 2005/0283832 | A1 * | 12/2005 | Pragada et al. | 726/12 |
| 2006/0029084 | A1 * | 2/2006 | Grayson | 370/401 |
| 2006/0034281 | A1 * | 2/2006 | Cain et al. | 370/390 |
| 2006/0039364 | A1 * | 2/2006 | Wright | 370/352 |
| 2006/0041666 | A1 * | 2/2006 | Karremans | 709/229 |
| 2006/0094476 | A1 * | 5/2006 | Guy | 455/574 |
| 2007/0089161 | A1 * | 4/2007 | Waris | 726/1 |
| 2007/0211694 | A1 * | 9/2007 | Rasanen | 370/352 |
| 2008/0168292 | A1 * | 7/2008 | Freedman | 713/375 |
| 2008/0229385 | A1 * | 9/2008 | Feder et al. | 726/1 |

OTHER PUBLICATIONS

Chan et al., "COPS Usage for Policy Provisioning (COPS-PR)", Mar. 2001, Network Working Group, 27 pages.*
Casani et al., "Implementation of a Policy Based Network Framework using Metapolicies", Dec. 2001, University of Waterloo.*
Boyle et al., "The COPS (Common Open Policy Service) Protocol", Mar. 1998.*
Yoon et al., "COPS-IDR: a protocol for Intrusion Detection & Response", ETRI.*

(Continued)

*Primary Examiner* — Krista M. Zele
*Assistant Examiner* — O. C. Vostal
(74) *Attorney, Agent, or Firm* — Harrity & Harrity, LLP

(57) ABSTRACT

A method may include recognizing, by a PEP, a connection failure to a PDP, establishing a reconnection, initiating, by the PEP, a fast state synchronization based on a client-open message of the common open policy service for policy provisioning (COPS-PR) protocol, receiving, by the PEP, an acceptance for the fast state synchronization based on a null decision message of the COPS-PR protocol, and transmitting, by the PEP, differential state information to the PDP.

20 Claims, 16 Drawing Sheets

(56) References Cited

OTHER PUBLICATIONS

Reichmeyer et al., "COPS Usage for Differentiated Services", 1998.*
Reichmeyer et al., "COPS Usage for Policy Provisioning", 1999.*
Chan et al., "COPS Usage for Policy Provisioning (COPS-PR)", 2000.*
Jaseemuddin et al., "COPS usage for Mobile IP (MIP)", 2000.*
Yavatkar et al., "RFC 2753—A Framework ofr Policy-based Admission Control", 2000.*
Colasoft Co. Ltd., "COPS (Common Open Policy Service)", Sep. 2006.*
Durham et al., "The COPS (COmmon Open Policy Service) Protocol", 2000.*
Herzog et al., "COPS usage for RSVP", 2000.*
Sahita et al., "Framework Policy Information Base", 2003.*
TSGS, "Meeting #15", 2002.*
Matsuoka et al., "MultiService Forum Implementation Agreement", 2005.*
Chan et al., "Differentialed Services Quality of Service Plicy Information Base", 2003.*
Phanse et al., "Protocol Support for Policy-Based Management of Mobile Ad Hoc Networks", 2004.*
Herzog et al., "COPS usage for RSVP", RFC 2749, Jan. 2000.*
Yavatkar et al., "A Framwork for Policy-based Admission Control", RFC 2753, Jan. 2000.*
McCloghrie et al., "Structure of Policy Provisioning Information (SPPI)", RFC 3159, Aug. 2001.*
Chan et al., "COPS Usage for Policy Provisioning (COPS-PR)", RFC 3084, Mar. 2001.*
Boyle et al., "The COPS (Common Open Policy Service) Protocol", RFCc 2748, Jan. 2000.*
Reichmeyer et al., "COPS Usage for Policy Provisioning", Jun. 1999.*
Reichmeyer et al., "COPS Usage for Policy Provisioning", Oct. 1999.*
Sanchez et al., "Requirements for Configuration Management of IP-based Networks", RFC 3139, Jun. 2001.*
Rawlins et al., "Framework for Policy Usage Feedback for Common Open Policy Service with Policy Provisioning (COPS-PR)", RFC 3483, Mar. 2003.*
Yavatkar et al., "A Framework for Policy-based Admission Control", RFC 2753, Jan. 2000.*
Beller et al., "Dynamic DiffServ Configuration Using COPS-PR", 2005.*
Yavatkar et al., "A Framework for Policy-based Admission Control", 2000.*
Franzen, "Differentiated Service Quality in IP Networks using COPS—an Object-Oriented Approach to the Protocol", 2004.*
K. Chan et al.; "Cops Usage for Policy Provisioning (COPS-PR)"; Network Working Group, Request for Comments: 3084; http://www.rfc-editor.org/rfc/rfc3084.txt; Mar. 2001; 32 pages.

* cited by examiner

COPS-PR ENHANCEMENTS TO SUPPORT FAST STATE SYNCHRONIZATION

BACKGROUND

A Common Open Policy Service (COPS) protocol for support of policy provisioning (COPS-PR) is defined in Internet Engineering Task Force (IETF) document, Request for Comments (RFC) 3084. As described, a policy enforcement point (PEP), such as a router, is required to buffer state information (e.g., request messages (REQs) and delete request state messages (DRQs)) while disconnected from a policy decision point (PDP), such as a policy server, and communicate this state information back to the PDP upon reconnection. However, the COPS-PR protocol fails to specify a mechanism to trigger a differential state synchronization. Rather, the PDP may request a full state synchronization from the PEP and perform reconciliation between the states on the PDP and the PEP. This process may consume a considerable amount of time and cause undesirable service disruption. Additionally, in instances when the PDP crashes and a back-up PDP is available, the back-up PDP may request a full state synchronization from the PEP, which may also consume a considerable amount of time.

SUMMARY

According to one aspect, a method may include recognizing, by a PEP, a connection failure to a PDP, establishing a reconnection, initiating, by the PDP, a fast state synchronization based on a client-open message of the common open policy service for policy provisioning (COPS-PR) protocol, receiving, by the PEP, an acceptance for the fast state synchronization based on a null decision of the COPS-PR protocol, and transmitting, by the PEP, differential state information to the PDP.

According to another aspect, a device may include a memory containing instructions for enforcing network policies, and a processor that executes the instructions. The processor may execute the instructions to establish a reconnection with a PDP after a connection failure, transmit, to the PDP, a client-open message of the common open policy service for policy provisioning (COPS-PR) protocol, determine whether to initiate a fast state synchronization based on one or more messages received from the PDP, the one or more messages being responsive to the client-open message, and transmit differential state information to the PDP when the one or more messages provide indication that the PDP is able to perform the fast state synchronization.

According to still another aspect, a device may include a memory containing instructions for managing network policies, and a processor that executes the instructions. The processor may execute the instructions to establish a reconnection with a PEP after a connection failure, determine whether to receive differential state information of a fast state synchronization based on one or more messages received from the PEP, transmit a null decision message of the common open policy service for policy provisioning (COPS-PR) protocol in response to the one or more messages, if it is determined that fast state synchronization should be performed, and receive the differential state information of the PEP.

According to yet another aspect, a computer-readable medium may have stored thereon instructions executable by at least one processor of a PEP. The computer-readable medium may include one or more instructions for enforcing network policies, one or more instructions for establishing a reconnection with a PDP if a connection failure occurs, one or more instructions for determining whether the PDP is the last PDP that managed the PEP based on a common open policy service for policy provisioning (COPS-PR) protocol message, and one or more instructions for performing a fast state synchronization based on one or more messages received from the PDP, where the one or more messages include an affirmation that the PDP is the last PDP that managed the PEP and that the PDP is able to perform the fast state synchronization.

According to still another aspect, a method may include receiving by a second PDP from a first PDP, state information relating to a PEP, storing, by the second PDP, the state information received from the first PDP, receiving, by the second PDP, a connection request from the PEP, the connection request including a request for fast state synchronization, identifying, by the second PDP, that the stored information corresponds to the PEP, acknowledging, by the second PDP, approval to perform fast state synchronization with the PEP, and receiving, by the second PDP, differential state information from the PEP.

BRIEF DESCRIPTION OF THE DRAWINGS

The accompanying drawings, which are incorporated in and constitute a part of this specification, illustrate one or more embodiments described herein and, together with the description, explain aspects of the invention. In the drawings.

DETAILED DESCRIPTION

The following detailed description refers to the accompanying drawings. The same reference numbers in different drawings may identify the same or similar elements. A detailed discussion of the underlying COPS-PR protocol has been omitted from this description and is assumed to be understood by the reader.

As described above, the COPS-PR protocol does not specify a negotiating mechanism for the PDP to request a differential state synchronization, such as a fast state synchronization (FSS). Further, from the perspective of the PEP, the COPS-PR protocol does not allow the PEP to initiate FSS. Rather, the PEP must wait to receive a synchronize state request (SSQ) message from the PDP. Additionally, the PEP does not know whether the PDP includes any of the currently installed state of the PEP.

Figure 1:
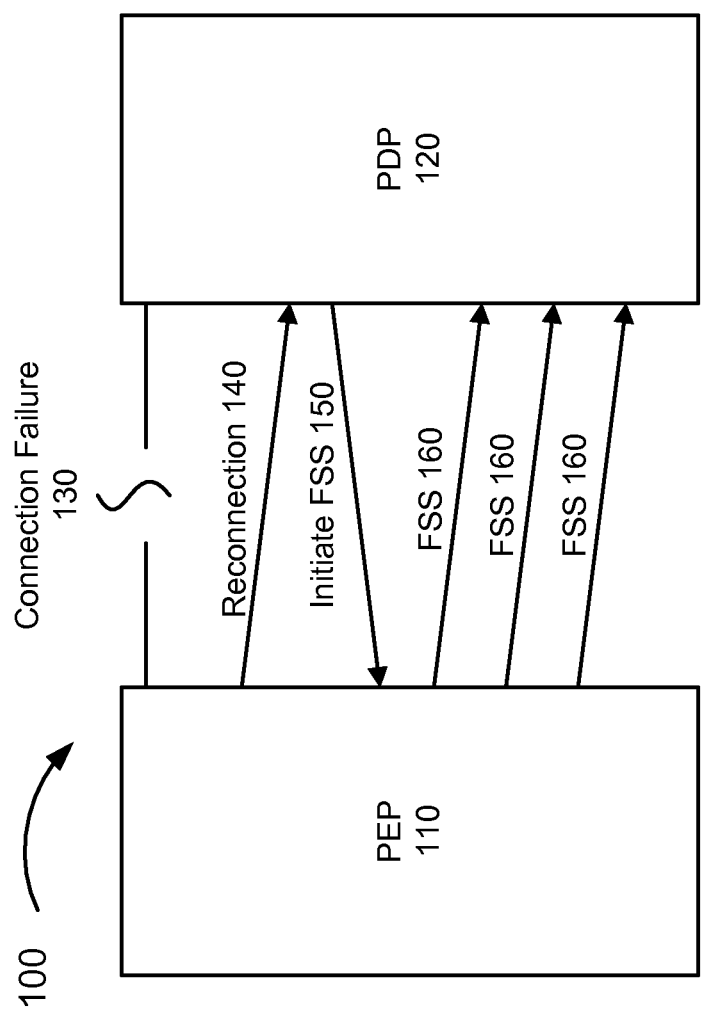
FIG. 1 is a diagram illustrating concepts described herein.

FIG. 1 is a diagram illustrating a system 100 in which concepts described herein may be implemented. As illustrated, system 100 may include, for example, a PEP 110 and a PDP 120. PEP 110 and PDP 120 may communicate based on the COPS-PR protocol. In accordance with this architecture, PDP 120 may retrieve policy information from a Policy Information Base (PIB), translate the retrieved policy information into policies, and provide the policies to PEP 110. Additionally, PDP 120 may process network service requests from PEP 110.

For purposes of discussion, assume that a connection failure 130 between PEP 110 and PDP 120 occurs. Further assume that connection failure 130 is not a result of PEP 110 needing to re-boot. In such an instance, PEP 110 may retain, for example, REQs and DRQs in, for example, a buffer. Under these exemplary conditions, FSS may be performed.

Upon establishing a reconnection 140 with PDP 120, PDP 120 may transmit a message 150 to initiate FSS operations. This is in contradistinction to what is normally done under the COPS-PR protocol, which is for PDP 120 to issue, for example, a SSQ message to request a full state synchronization or to immediately start normal operation without waiting for directions from the PDP. In turn, PEP 110 may transmit messages 160 (e.g., REQs, DRQs, etc.) to PDP 120 so that FSS may be performed, and PDP 120 may reconcile state information with PEP 110 for events that may have occurred during connection failure 130.

As a result of the foregoing, a negotiating mechanism for determining whether to initiate FSS or full state synchronization may be employed. The concepts described herein may provide significant improvement in service to subscribers after a connection failure by eliminating unnecessary delay when FSS is viable. The concepts described herein have been partially described in connection to FIG. 1, and additional omissions relating to the COPS-PR protocol will be described below.

Exemplary Environment

Figure 2:
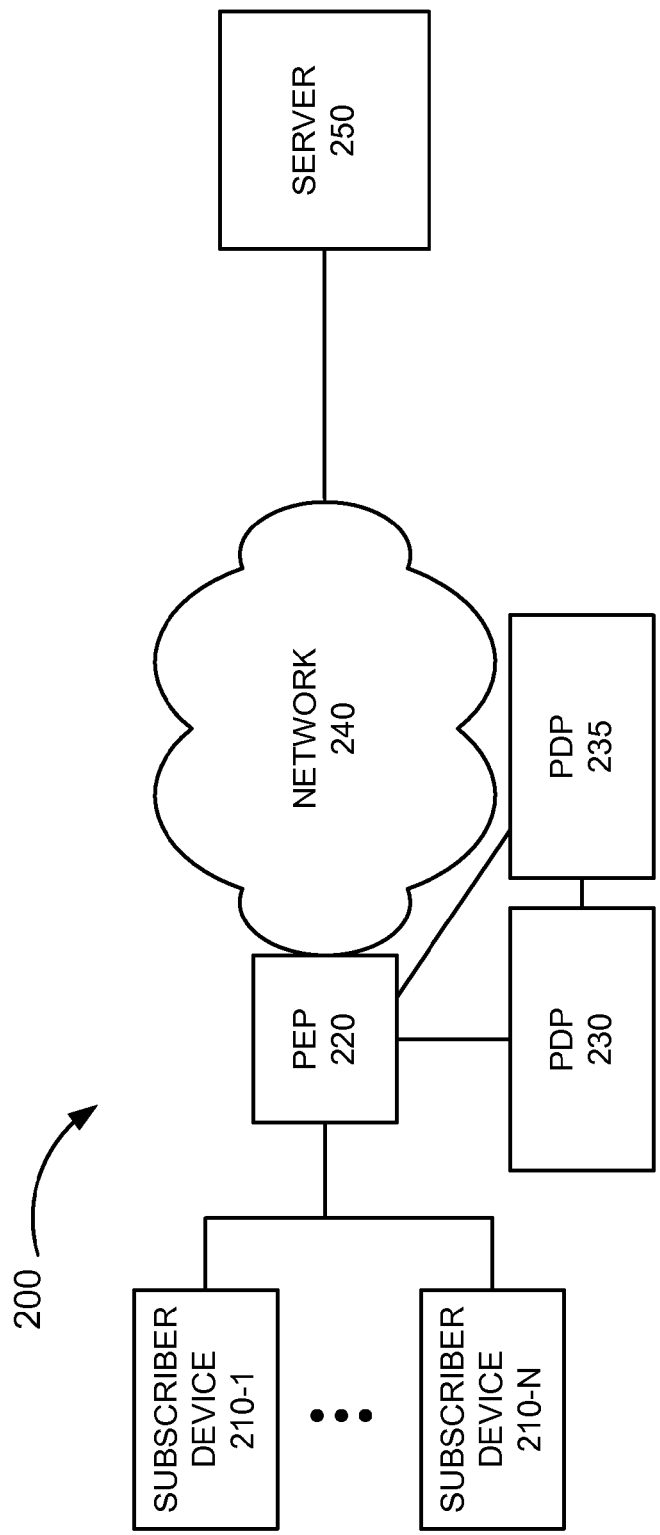
FIG. 2 is a diagram illustrating an exemplary environment in which concepts described herein may be implemented.

FIG. 2 is a diagram illustrating an exemplary environment 200 in which concepts described herein may be implemented. As illustrated, environment 200 may include a group of subscriber devices 210-1 through 210-N (collectively referred to hereinafter as subscriber devices 210), a PEP 220, a PDP 230, a PDP 235, a network 240, and a server 250. The connections of environment 200 may be, for example, wired, and/or wireless, and the connections may be direct and/or indirect.

Each of subscriber devices 210 may include any device capable of transmitting to and/or receiving from PEP 220. For example, subscriber devices 210 may include a desktop computer, a laptop computer, a personal digital assistant (PDA), a television, a telephone device, a video game console, or another type of computation and/or communication device.

PEP 220 may include a device capable of exchanging data to and from subscriber devices 210 and network 240. In one implementation, PEP 220 may include an edge router. Additionally, or alternatively, PEP 220 may include a public interface to network 240. PEP 220 may operate as a PEP on behalf of PDP 230 by allowing subscriber devices 210 to access resources on server 250. PEP 220 may communicate with PDP 230 in accordance with the COPS-PR protocol.

PDP 230 may include a device capable of retrieving request service policies and subscriber profiles from, for example, a lightweight directory access protocol (LDAP) based directory, and configure a client device, such as PEP 220, to deliver a subscriber requested service to subscriber devices 210. PDP 230 may translate services into policies and send the policies to PEP 220. PDP 230 may include one or more policy information base (PIB) files that describe network policies in a textual format. PDP 230 may communicate with PEP 220 in accordance with the COPS-PR protocol. PDP 235 may include a device analogous to that of PDP 230. As will be described below, PDP 230 may correspond to an active PDP, and PDP 235 may correspond to a standby PDP, or vice versa.

Network 240 may include, for example, the Internet, an Intranet, a local area network (LAN), a wide area network (WAN), a wireless network, a telephone network (e.g., a Public Switched Telephone Network (PSTN)), or a combination of networks.

Server 250 may include a device that stores and/or runs applications that provide and/or aid in providing media content to subscribers associated with subscriber devices 210. Media content may include, for example, video-on-demand, live or pre-recorded television or radio broadcasts, streaming music, on-line gaming, other voice and/or video content, textual information, and/or any other type of asset.

Although FIG. 2 illustrates an exemplary environment, in other implementations, environment 200 may include fewer, additional, or different devices. For example, environment 200 may not include network 240. Additionally, or alternatively, the PEP may be a device other than PEP 220 and/or the PDP may be a device other than PDP 230.

Exemplary Device

Figure 3:
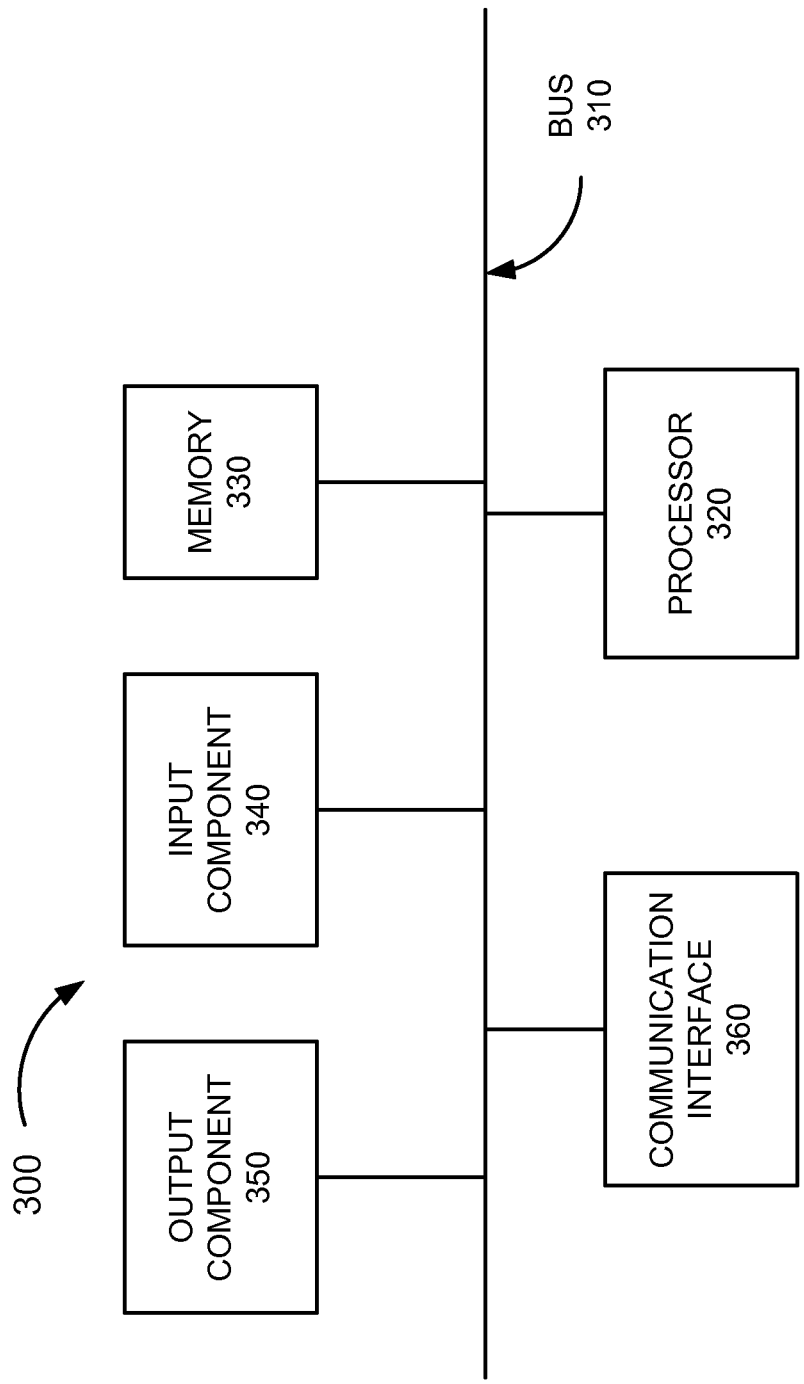
FIG. 3 is a diagram illustrating exemplary components of a device that may correspond to one or more of the devices depicted in FIG. 2.

FIG. 3 is a diagram illustrating exemplary components of a device 300 that may correspond to one or more of the devices depicted in FIG. 2. For example, device 300 may correspond to subscriber devices 210, PEP 220, PDP 230, PDP 235, and/or server 250. The term "component," as used herein, is intended to be broadly interpreted to include hardware, software, or a combination of hardware and software. As illustrated, device 300 may include a bus 310, a processor 320, a memory 330, an input component 340, an output component 350, and/or a communication interface 360.

Bus 310 may include a path that permits communication among the components of device 300. For example, bus 310 may include a system bus, an address bus, a data bus, and/or a control bus. Bus 310 may also include bus drivers, bus arbiters, bus interfaces, and/or clocks.

Processor 320 may include a general-purpose processor, a microprocessor, a data processor, a co-processor, a network processor, an application specific integrated circuit (ASIC), a controller, a programmable logic device, a chipset, a field programmable gate array (FPGA), and/or processing logic that may interpret and execute instructions. "Processing logic," as used herein, may include hardware, software, or a combination of hardware and software.

Memory 330 may include any type of component that stores data and instructions related to the operation and use of device 300. For example, memory 330 may include a memory component, such as a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable read only memory (EEPROM), and/or a flash memory. Additionally, memory 330 may include a storage component, such as a magnetic storage component (e.g., a hard drive), a compact disc (CD) drive, a digital versatile disc (DVD) drive, or another type of computer-readable medium. Memory 330 may also include an external storing component, such as a universal serial bus (USB) memory stick, a digital camera memory card, and/or a Subscriber Identity Module (SIM) card.

Input component 340 may include a mechanism that permits an operator of device 300 to input information to device 300, such as a keyboard, a keypad, a button, a switch, voice recognition, etc. Output component 350 may include a mechanism that outputs information to an operator of device 300, such as a display, a speaker, one or more light emitting diodes (LEDs), etc.

Communication interface 360 may include any transceiver-like component that enables device 300 to communicate with other devices and/or systems. For example, communication interface 360 may include an Ethernet interface, an optical interface, a coaxial interface, a radio interface, etc.

As will be described in detail below, device 300 may perform certain operations relating to the concepts described herein. Device 300 may perform these operations in response to processor 320 executing software instructions contained in a computer-readable medium, such as memory 330. A computer-readable medium may be defined as a physical or logical memory device.

The software instructions may be read into memory 330 from another computer-readable medium or from another device via communication interface 360. The software instructions contained in memory 330 may cause processor 320 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 illustrates exemplary components, in other implementations fewer, additional, or different components may be utilized. For example, device 300 may include a touch screen or another type of input/output device. Additionally, or alternatively, functionalities of some components of device 300 may be incorporated into other components of device 300. For example, part of processor 320 and/or part of memory 330 may be included in communication interface 360. Additionally, or alternatively, part of memory 330 may be included in processor 320. Further, in other implementations, the configuration of the components, as depicted in FIG. 3, may be different.

Exemplary Fast State Synchronization

Figure 4:
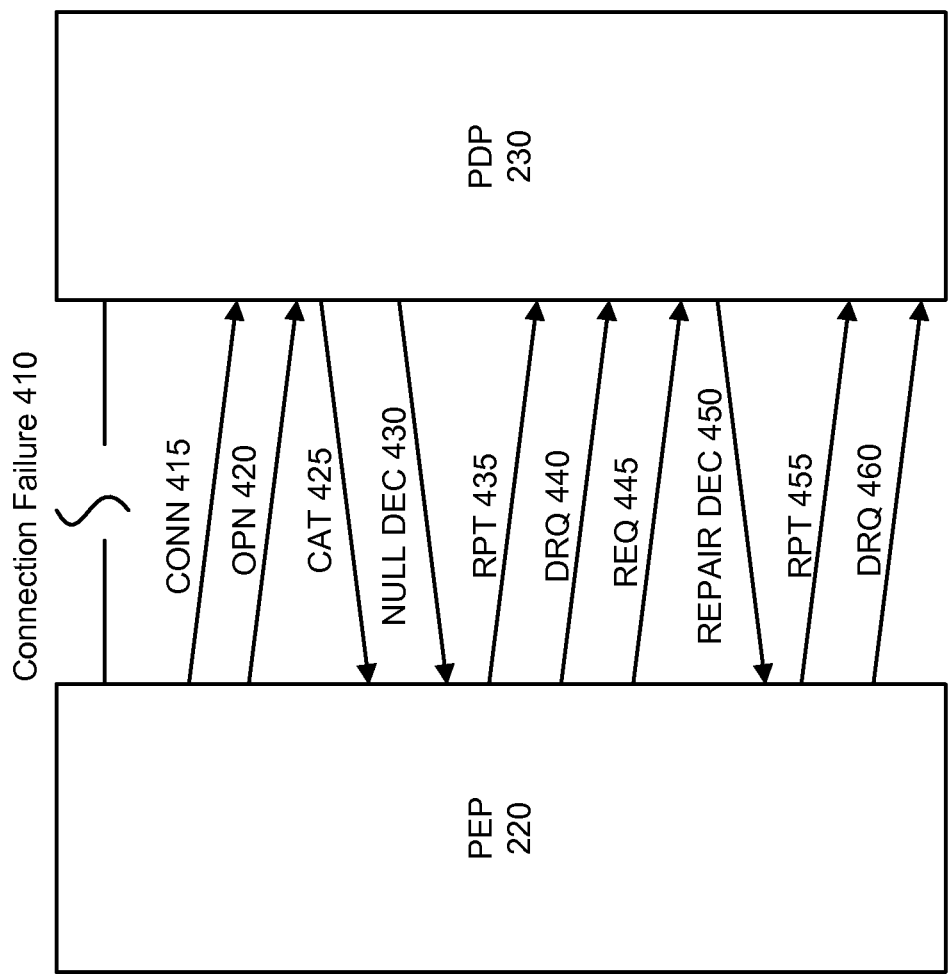
FIG. 4 is a diagram illustrating exemplary message exchanges between a PEP and a PDP for performing operations that may be associated with the concepts described herein.

FIG. 4 is a diagram illustrating exemplary message exchanges between PEP 220 and PDP 230 for performing operations that may be associated with the concepts described herein. As illustrated, PEP 220 and PDP 230 may exchange messages to perform FSS. For purposes of discussion, assume that a connection failure between PEP 220 and PDP 230 occurs. Further assume that the connection failure is not a result of PEP 220 needing to re-boot. In such an instance, PEP 220 may retain, for example, REQs and DRQs in, for example, memory 330. That is, in accordance with the COPS-PR protocol, a PEP, such as PEP 220, may buffer REQs and DRQs. Under such conditions, for example, FSS may be performed according to the exemplary message exchanges described below.

As illustrated in FIG. 4, a connection failure 410 may occur. In one implementation, PEP 220 may establish a connection (CONN) 415 (e.g., a Transmission Control Protocol (TCP) connection) with PDP 230. Upon establishing CONN 415 with PDP 230, PEP 220 may transmit a client-open (OPN) message 420. OPN message 420 may include an argument. As specified in the COPS-PR protocol, one example of an argument may be a last PDP address (<LastPDPAddr>). The last PDP address argument relates to an address of the last PDP, such as PDP 230, which managed PEP 220. In conformance thereto, OPN message 420 may include, for example, an Internet Protocol (IP) address and a port number of the last PDP that managed PEP 220, such as PDP 230.

Upon receipt of OPN message 420, PDP 230 may recognize that the IP address and the port number corresponds to it (i.e., PDP 230). Additionally, PDP 230 may recognize that it has state information that is installed on PEP 220. Based on this information, PDP 230 may determine that FSS is appropriate. In other words, for example, if OPN message 420 does not include the last PDP address argument, the IP address and the port number does not correspond to PDP 230, and/or PDP 230 rebooted and lost its state information associated with PEP 220 as a result of connection failure 410, PDP 230 may determine that a full state synchronization should be performed.

In response, PDP 230 may transmit a client-accept (CAT) message 425 indicating acceptance of OPN message 420. Further, PDP 230 may issue an unsolicited, null decision (NULL DEC) message 430 on a shared context to PEP 220 to indicate to PEP 220 that FSS may be performed. The issuance by PDP 230 of NULL DEC message 430 is in contradistinction to what is normally done under the COPS-PR protocol. That is, under similar circumstances, PDP 230 may issue, for example, a SSQ message to request a full state synchronization. Based on these messages from PDP 230, PEP 220 may recognize that PDP 230 is ready for FSS.

In response to NULL DEC message 430, PEP 220 may transmit a report state (RPT) message 435 to indicate approval for FSS. Thereafter, FSS may begin. For example, PEP 220 may then transmit one or more DRQ messages 440 for each lost interface and address that may have occurred during connection failure 410. Additionally, or alternatively, PEP 220 may transmit one or more REQ messages 445 for each new interface and address that may have occurred during connection failure 410.

Additionally, or alternatively, PDP 230 may transmit a repair decision (REPAIR DEC) message 450 to PEP 220 for each interface and address that PDP 230 is not sure of its state. A REPAIR DEC message may be a DEC message in which the <DecisionFlags> object has the flag Request-State set. Both the object and the flag are standard COPS-PR entities. In turn, PEP 220 may transmit a RPT message 455 indicating success. Additionally, PEP 220 may transmit a DRQ message 460 for each interface and address corresponding to REPAIR DEC message 450. PEP 220 may thereafter erase the state it knows with respect to each interface and address, and consider each interface as new. That is, the interface may be treated as if it had just been created, thus causing PEP 220 to issue a REQ message for it on the same context/handle as its previous incarnation. On the other hand, addresses may not be treated as new. Rather, addresses may be cleaned up or revoked.

Although FIG. 4 illustrates an exemplary process, in other implementations, fewer, additional, or different operations may be performed. In accordance with the exemplary message exchanges described above, FSS may be performed during a time frame that is significantly less (e.g., approximately 10 seconds or more) than a time frame required for a full state synchronization (e.g., approximately 15 minutes or more) for a fully loaded PEP (e.g., approximately 50,000 subscribers).

Exemplary Management of DRQs

Figure 5:
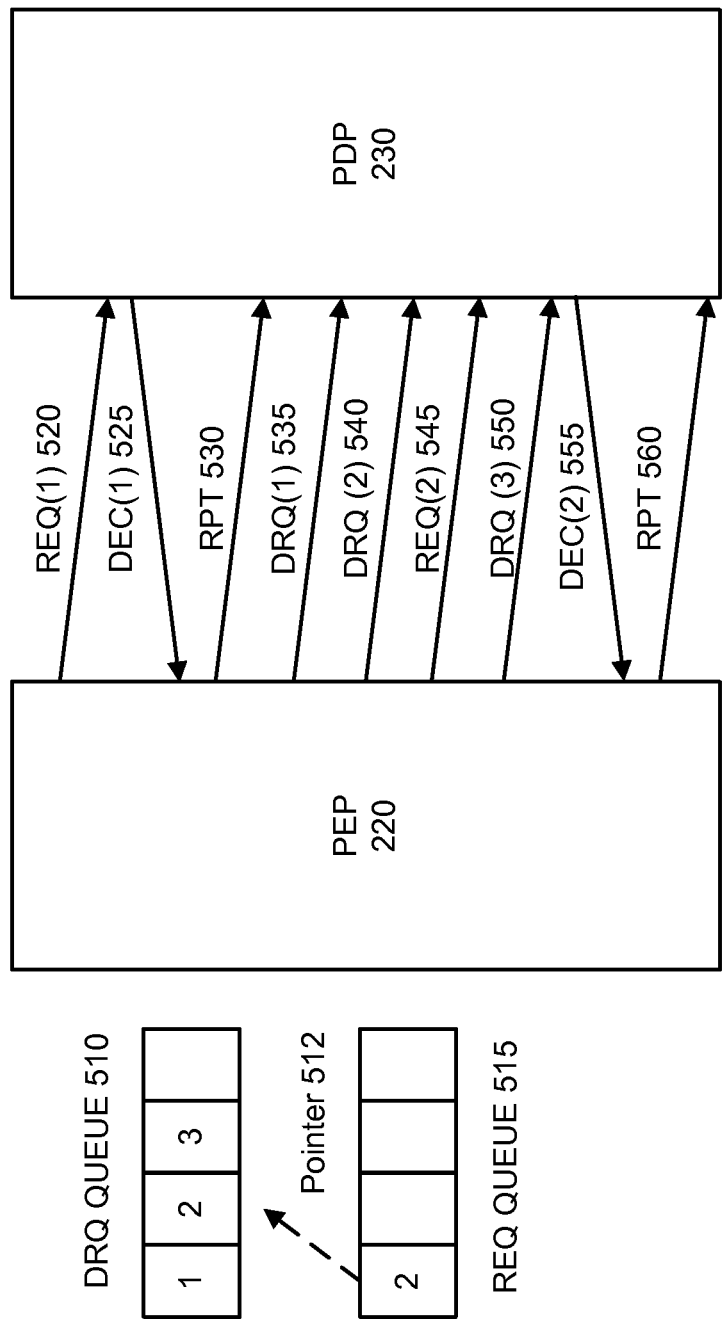
FIG. 5 is a diagram illustrating exemplary message exchanges between a PEP and a PDP for performing operations to manage delete state request messages that may be associated with the concepts described herein.

FIG. 5 is a diagram illustrating exemplary message exchanges between PEP 220 and PDP 230 for performing operations to manage DRQ messages that may be associated with the concepts described herein. The COPS-PR protocol does not require PDP 230 to acknowledge a DRQ message from PEP 220. In this regard, PEP 220 may be unsure whether a DRQ message was received by PDP 230. However, PEP 220 may determine whether a DRQ message was received by PDP 230 based on the concepts described herein.

For example, consider the message exchanges illustrated in FIG. 5, as well as a DRQ queue 510, a pointer 512, and a REQ queue 515. PEP 220 may send a REQ (1) message 520 to PDP 230. In this example, the (1) associated with REQ (1) message represent a handles. PDP 230 may respond with a DEC (1) message 525. In reply, PEP 220 may send a RPT message 530 indicating success.

Subsequently, PEP 220 may issue a DRQ (1) message 535, a DRQ (2) message 540, followed by a REQ (2) message 545, and a DRQ (3) message 550. As PEP 220 issues a DRQ message, router may maintain a copy of the DRQ message in DRQ queue 510, as illustrated in DRQ queue 510 as "1," "2,"
and "3." PEP 220 may maintain the copy of the DRQ message in DRQ queue 510 until PEP 220 determines that the DRQ message has been handled by PDP 230, as described herein.

Additionally, as PEP 220 issues a REQ message, PEP 220 may maintain a copy of the REQ message in REQ queue 515. Additionally, pointer 512 may be generated that points to the memory location of DRQ (2) message 540 of DRQ queue 510. In this way, a locator relating to DRQs sent prior to the REQ message may be maintained.

As further illustrated, PDP 230 may issue a DEC (2) message 555 to PEP 220. Based on DEC (2) message 555, PEP 220 may consult DRQ queue 510 and REQ queue 515. PEP 220 may determine that REQ (2) message 545 was issued after DRQ (2) message 540 based on the pointer. Thus, PEP 220 may determine that since PDP 230 issued DEC (2) message 555 in response to REQ (2) message 545, then DRQ (1) message 535 and DRQ (2) message 540 were properly received by PDP 230. That is, since a TCP connection between PEP 220 and PDP 230 was maintained during this time, and under a TCP connection the ordering of the messages is guaranteed, PEP 220 may conclude that DRQ (1) message 535 and DRQ (2) message 540 were properly received by PDP 230.

In one implementation, PEP 220 may remove DRQ (1) message 535 and DRQ (2) message 540 from DRQ queue 510 when DEC (2) message 555 is received, and/or REQ (2) message 545 from REQ queue 515. Thus, if a connection break should occur thereafter, and FSS is performed, PEP 220 may determine that DRQ (3) message 550 may need to be resent to PDP 230, but not DRQ (1) message 535, DRQ (2) message 540, and REQ (2) message 545. That is, as illustrated in FIG. 4, during FSS, DRQ message 445 may correspond to DRQ (3) message 550. Further, in the event that DRQ (3) message 550 was received by PDP 230 before a connection failure, if PDP 230 should receive DRQ (3) message 550 again during FSS, PDP 230 may merely determine that DRQ (3) message 550 was already handled.

As further illustrated in FIG. 5, PEP 220 may issue a RPT message 560 to PDP 230 in reply to DEC (2) message 555 to indicate success.

Although FIG. 5 illustrates an exemplary process, in other implementations, fewer, additional, or different operations may be performed. Additionally, or alternatively, different data structures, other than a queue, may be employed. Additionally, or alternatively, a mechanism other than a pointer may be employed.

Exemplary Handling of Unknown States

Figure 6A:
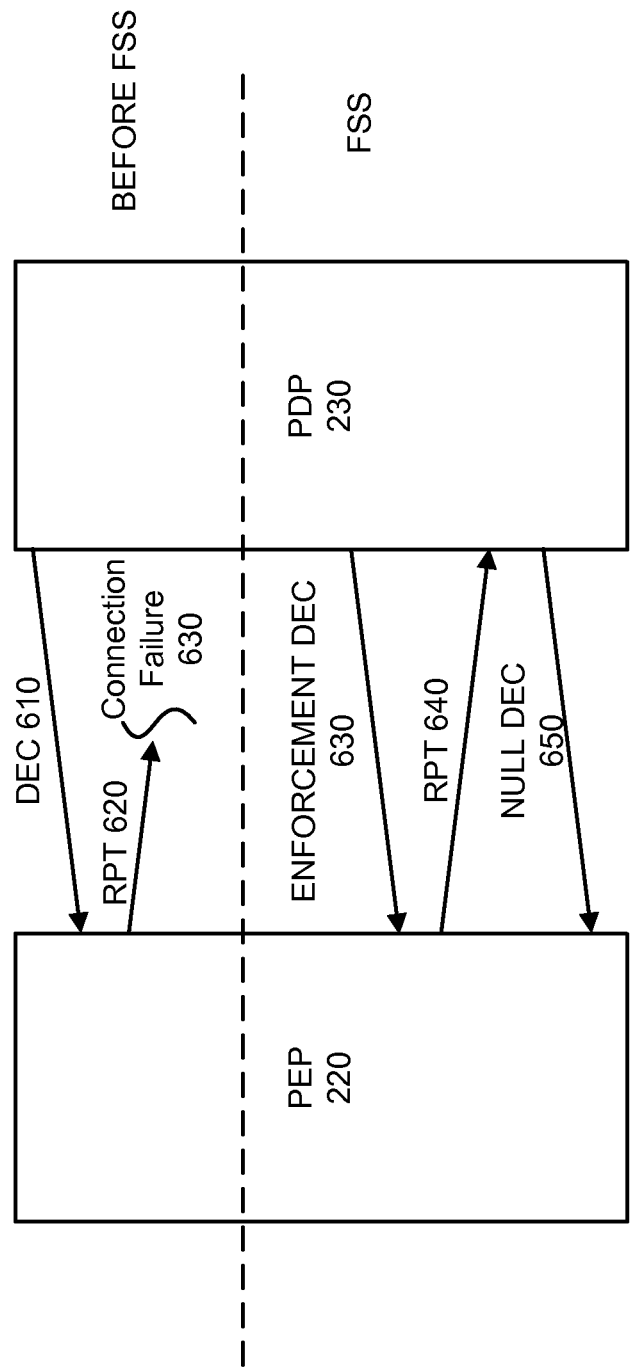
FIGS. 6A and 6B are diagrams illustrating exemplary message exchanges between a PEP and a PDP for performing operations to handle unknown states that may be associated with the concepts described herein.
Figure 6B:
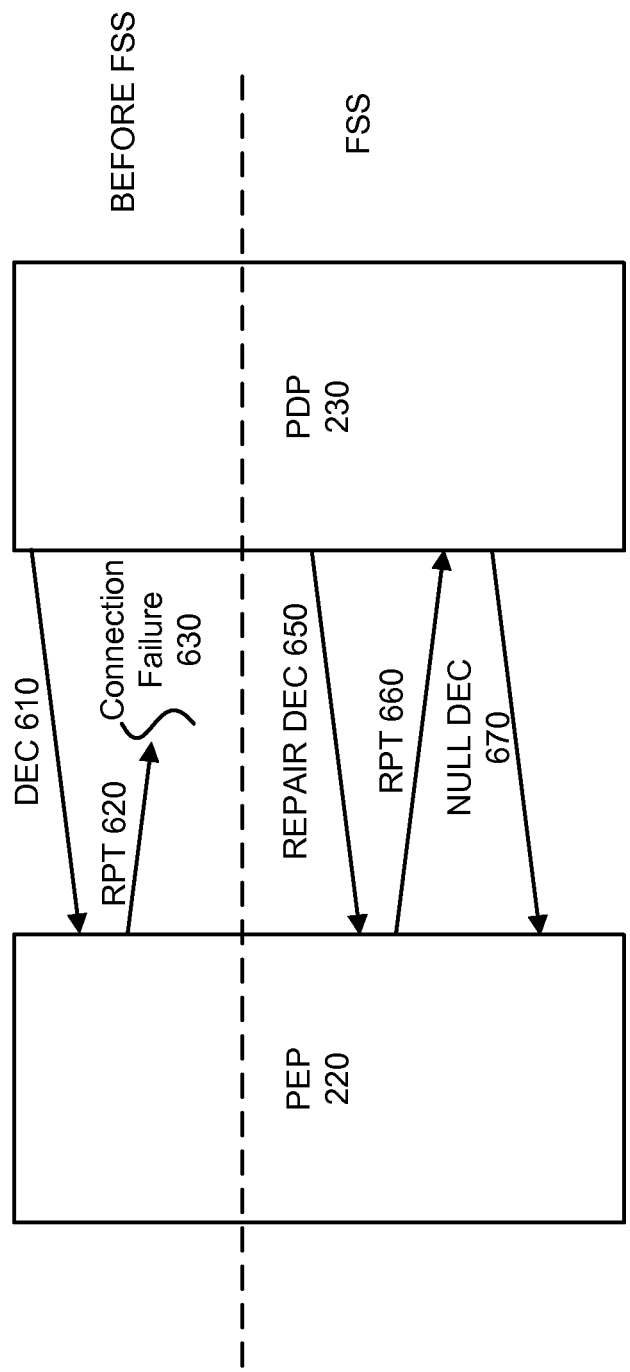

FIGS. 6A and 6B are diagrams illustrating exemplary message exchanges between PEP 220 and PDP 230 for performing operations to handle unknown states that may be associated with the concepts described herein. As illustrated in FIG. 6A, when PDP 230 issues a DEC message 610, PEP 220 may transmit a RPT message 620. RPT message 620 may inform PDP 230 if policy data is installed (e.g., Report-Type="Success") or not (Report-Type="Failure"). However, for purposes of discussion, assume that a connection failure 630 occurs and RPT message 620 is not received by PDP 230. Connection failure 630 may be the result of a communication failure (e.g., a socket failure) and/or PEP 220 overload (e.g., a timeout) which would allow FSS to be implemented. However, there exists an unknown state since PDP 230 did not receive RPT message 620 as specified in accordance with the COPS-PR protocol.

When considering employing a full state synchronization (e.g., when connection failure is a result of PEP 220 and/or PDP 230 crashing), the unknown state may be considered trivial because PEP 220 may supply PDP 230 with full state information after connection failure 630 (i.e., when a connection is re-established). However, when considering employing FSS, the unknown state may be dealt with differently. For example, in one implementation, if PDP 230 issues DEC message 610 and expects to receive RPT message 620, but does not, PDP 230 may interpret this occurrence as a failure and roll back to a previous good state (i.e., a state before DEC message 610 was issued).

Depending on the content of DEC message 610, PDP 230 may perform different operations. For example, one possibility is that DEC message 610 includes information relating to a shared context. The shared context may contain policies to be installed on PEP 220. Another possibility is that DEC message 610 includes information relating to an interface context. The interface context may include a decision pertaining to an interface. The concepts associated with dynamic contexts (e.g., an interface context, an address context) is described in U.S. patent application Ser. No. 11/534,460, entitled "DYNAMIC SERVICE ACTIVATION USING COPS-PR," filed on Sep. 22, 2006, the entire content of which is incorporated herein by reference.

In the event that DEC message 610 relates to a shared context, during a period before FSS, PDP 230 may remember DEC message 610 and the object it tried to install/uninstall on PEP 220. Subsequently, for example, PDP 230 may issue an ENFORCEMENT DEC message 630 to undo the action associated with the original DEC message 610. That is, for example, ENFORCEMENT DEC message 630 may be issued after a REPAIR DEC message, but before a NULL DEC message on the shared context is issued. In this regard, ENFORCEMENT DEC message 630 will not reattempt the original actions associated with DEC message 610. For example, if DEC message 610 pertained to installing an object, ENFORCEMENT DEC message 630 will command PEP 220 to uninstall the object. Conversely, if DEC message 610 pertained to uninstalling an object, ENFORCEMENT DEC message 630 will command PEP 220 to re-install the object.

In response thereto, PEP 220 may issue a RPT message 640 indicating a success or a failure. For example, if RPT message 640 includes a success message, then this indicates that DEC message 610 was previously carried out and that ENFORCEMENT DEC message 630 reversed the original DEC message 610 action. Thus, referring to FIG. 6A, if DEC message 610 was a decision to install an object, then PEP 220 installed the object (i.e., RPT message 620 indicates success). Thereafter, PDP 230 may issue ENFORCEMENT DEC message 630 to uninstall the object, and PEP 220 may issue RPT message 640 indicating success (i.e., the object was uninstalled). Conversely, for example, if DEC message 610 was a decision to uninstall an object, then PEP 220 uninstalled the object (i.e., RPT message 620 indicates success). Thereafter, PDP 230 may issue ENFORCEMENT DEC message 630 to install the object, and PEP 220 may issue RPT message 640 indicating success (i.e., the object was installed). PDP 230 may then issue a NULL DEC message 650 analogous to NULL DEC message 430 of FIG. 4.

On the other hand, PEP 220 may refuse ENFORCEMENT DEC message 630 if DEC message 610 was never carried out by PEP 220. For example, if DEC message 610 was a decision to install an object, then PEP 220 may not install the object (i.e., RPT message 620 indicates failure). Thereafter, PDP 230 may issue ENFORCEMENT DEC message 630 to uninstall the object, and PEP 220 may issue RPT message 640 indicating failure (i.e., object was not previously installed). Conversely, for example, if DEC message 610 was a decision to uninstall an object, then PEP 220 may not uninstall the object (i.e., RPT message 620 indicates failure). Thereafter, PDP 230 may issue ENFORCEMENT DEC message 630 to install the object, and PEP 220 may issue RPT message 640 indicating failure (i.e., object was previously installed). In this way, PDP 230 may determine the state information of PEP 220. PDP 230 may then issue a NULL DEC message 650 analogous to NULL DEC message 430 of FIG. 4.

Referring to FIG. 6B, in the event that DEC message 610 relates to an interface context, PDP 230 may flag the interface as no good. Thereafter, for example, PDP 230 may send a REPAIR DEC message 650 associated with the flagged interface. REPAIR DEC message 650 may correspond to REPAIR DEC message 450, as previously described and illustrated in FIG. 4. Similar to that described and illustrated in FIG. 4, PEP 220 may issue a RPT message 660 and PDP 230 may issue a NULL DEC message 670. Although not illustrated, PEP 220 may subsequently issue a DRQ message(s) corresponding to the REPAIR DEC message(s). In this way, PDP 230 will be assured that the context(s) has been cleaned up based on the received DRQ message(s).

Although FIGS. 6A and 6B illustrate exemplary processes, in other implementations, fewer, additional, or different operations may be performed.

Exemplary Processes to Replicate State Information

As previously described, if the PEP, such as PEP 220, does not need to reboot, FSS may be performed. Further, in some instances, the PEP may include more than one service routing protocol (SRP) component. For example, the PEP may include a master SRP component and a slave SRP component. Thus, in the event that the master SRP component crashes, the slave SRP component may take over provided some form of "mirroring" occurred between the master SRP component and the slave SRP component. However, in instances when the PDP crashes, even when a back-up PDP may exist, a full state synchronization may need to be performed. That is, the back-up PDP may initiate a full state synchronization with the PEP 220 since the back-up PDP does not include the state information of PEP 220 and/or does not include the state information of the other PDP. Accordingly, as described herein, the COPS-PR protocol may be used to replicate state information on a standby PDP, such as PDP 235, so that if the active PDP, such as PDP 230 crashes, PDP 235 may perform FSS as well as other operations to be described.

Connection Establishment for State Replication

Figure 7:
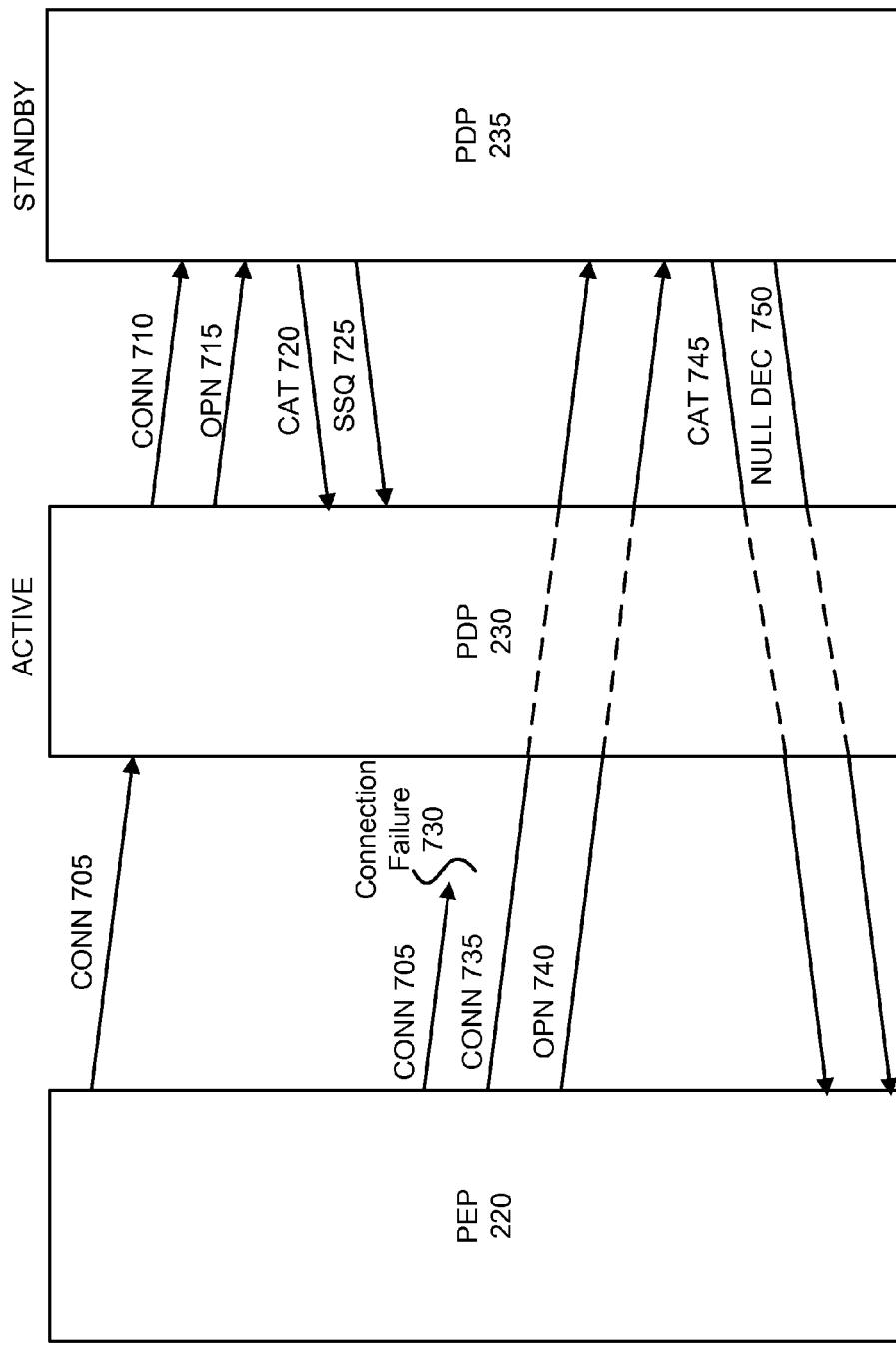
FIG. 7 is a diagram illustrating exemplary message exchanges among a PEP, an active PDP, and a standby PDP for performing connection operations that may be associated with the concepts described herein.

FIG. 7 is a diagram illustrating exemplary message exchanges among PEP 220, PDP 230, and PDP 235 for performing connection operations that may be associated with the concepts described herein.

As illustrated, PEP 220 may establish a connection (CONN) 705 with PDP 230. For purposes of discussion, assume PDP 230 is the active PDP. In turn, PDP 230 may establish a connection (CONN) 710 with PDP 235. For purposes of discussion, assume PDP 235 is the standby PDP. In one implementation, local configuration information may be installed on PDP 230 and PDP 235 so that each device knows that they form an active and standby PDP pair.

PDP 230 may also issue a OPN message 715 to PDP 235. OPN message 715 may include the last PDP address argument having a particular value of, for example, 255.255.255.255 (a default address typically used for broadcasts). Given the value of the last PDP address argument (i.e., that no PDP would have such an address), PDP 235 may recognize that OPN message 715 came from another PDP, such as PDP 230. PDP 235 may respond with a CAT message 720 indicating that PDP 235 will operate as a standby PDP. PDP 235 may also issue a SSQ message 725 to PDP 230 to initiate full state synchronization. Thus, the state information of PDP 230 may be replicated on PDP 235 until CONN 710 is broken.

Thereafter, assume a connection failure 730 occurs between PEP 220 and PDP 230. PEP 220 may establish a connection (CONN) 735 with PDP 235 based on, for example, local configuration information residing in PEP 220. PEP 220 may also issue an OPN message 740 to PDP 235. OPN message 740 may include the last PDP address argument corresponding to the address of PDP 230. Although the last PDP address does not match the address of PDP 235, PDP 235 may recognize the address as an address corresponding to PDP 230. Thus, PDP 235 may determine that it has the state information of PEP 220 and may perform FSS. As further illustrated, PDP 235 may issue a CAT message 745 and a NULL DEC 750 to initiate FSS with PEP 220.

Although FIG. 7 illustrates an exemplary process, in other implementations, fewer, additional, or different operations may be performed.

Replication of PEP Notifications

Figure 8:
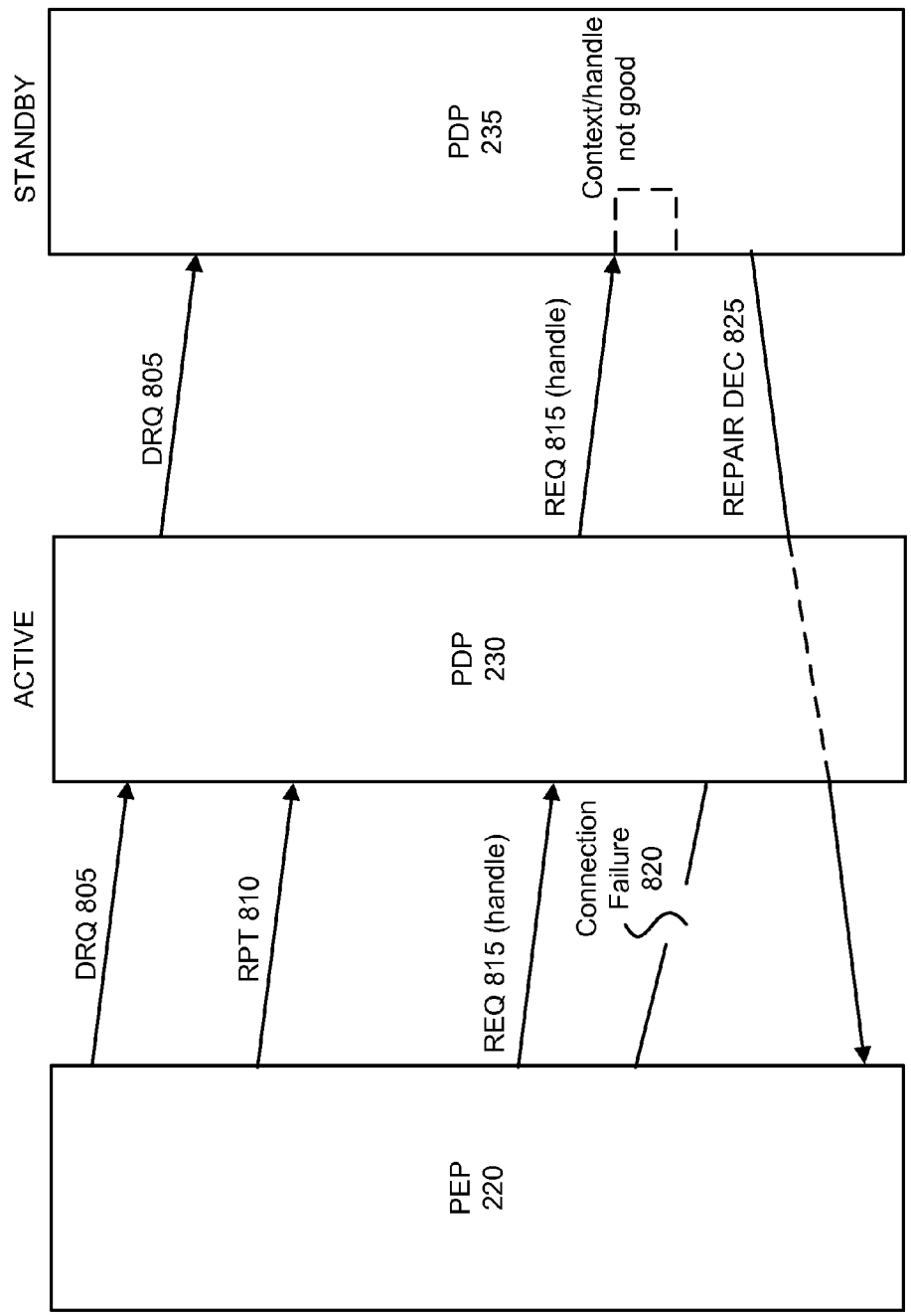
FIG. 8 is a diagram illustrating exemplary message exchanges among a PEP, an active PDP, and a standby PDP for replicating notification state information that may be associated with the concepts described herein.

FIG. 8 is a diagram illustrating exemplary message exchanges among PEP 220, PDP 230 and PDP 235 for replicating notification state information relating to notifications from PEP 220 that may be associated with the concepts described herein. For purposes of discussion, assume that a connection between PEP 220 and PDP 230 exists, and a connection between PDP 230 and PDP 235 exists.

As illustrated, FIG. 8 depicts exemplary message exchanges to replicate notifications (e.g., a DRQ message, a RPT message, and a REQ message) from PEP 220. For example, PEP 220 may issue a DRQ message 805 to PDP 230. PDP 230 may handle DRQ message 805 internally, and may forward DRQ message 805 to PDP 235 so that state information may be replicated. In another instance, PEP 220 may issue an unsolicited RPT message 810 to PDP 230. Again, PDP 230 may handle RPT message 810 internally, but may not forward RPT message 810 to PDP 235. Thus, in one implementation, there may be no replication or accounting of state information relating to an unsolicited RPT message.

Still, in another instance, PEP 220 may issue a REQ message 815 to PDP 230. PDP 230 may process REQ message 815 in accordance with the COPS-PR protocol. Additionally, PDP 230 may forward REQ message 815 to PDP 235. For example, REQ message 815 may include a client handle that identifies an installed state. When PDP 235 receives REQ message 815, PDP 235 may create a context internally and mark this context associated with the client handle as, for example, "not good." That is, while PDP 235 is made aware of REQ message 815, the context associated with the client handle may be marked because the outcome of REQ message 815 is not yet known.

If a connection failure 820 should subsequently occur, and PDP 235 becomes the active PDP, the client handle marked as "not good" may be repaired. That is, PDP 235 may issue a REPAIR DEC message 825 associated with the client handle to PEP 220, after which the operations previously described and illustrated with respect to FIG. 4 may be performed. In this way, PDP 235 and PEP 220 may reconcile state information.

Although FIG. 8 illustrates an exemplary process, in other implementations, fewer, additional, or different operations may be performed.

Replication of solicited DECs

Figure 9:
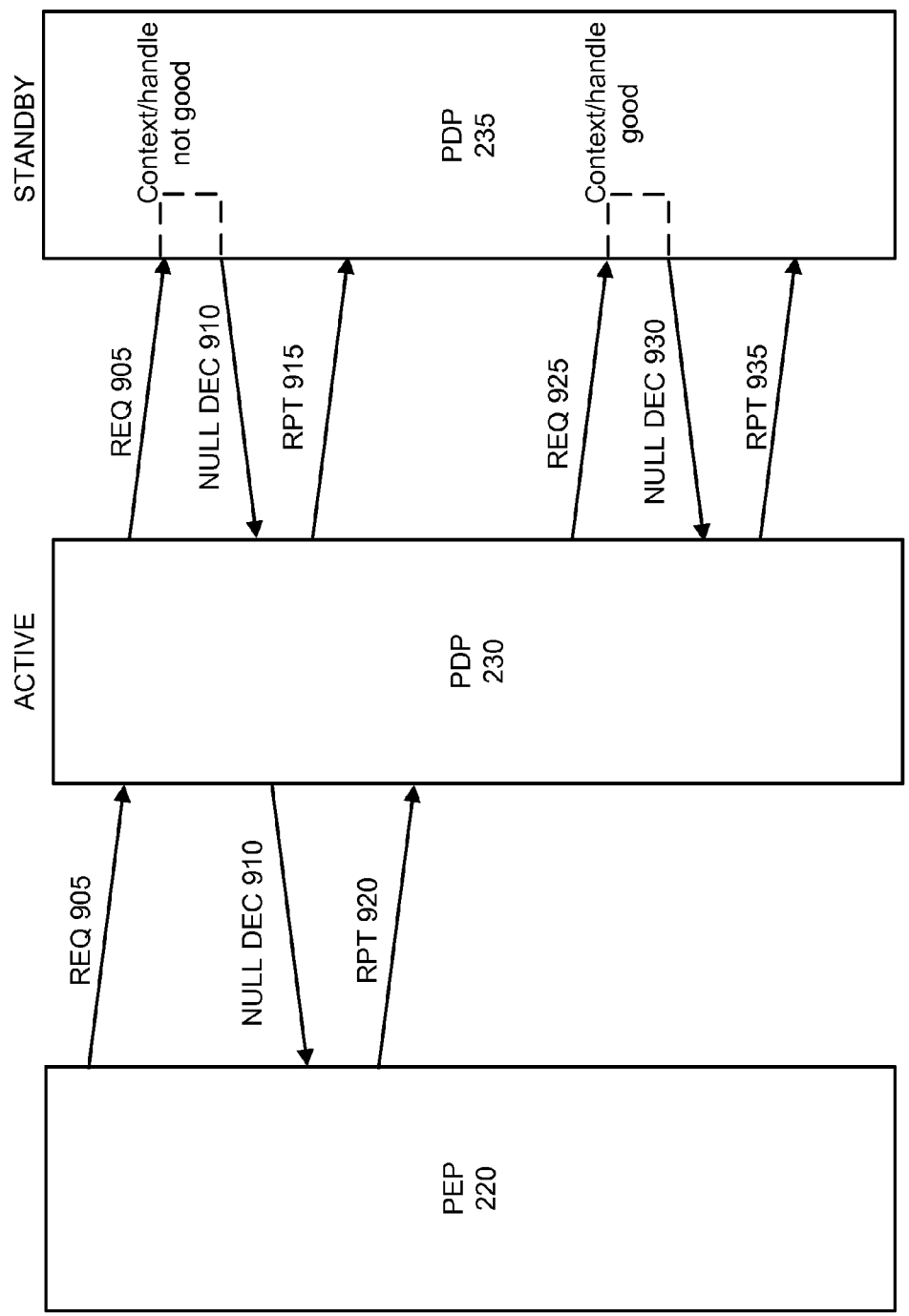
FIG. 9 is a diagram illustrating exemplary message exchanges among a PEP, an active PDP, and a standby PDP for replicating state information of a solicited decision to not install policies that may be associated with the concepts described herein.
Figure 10:
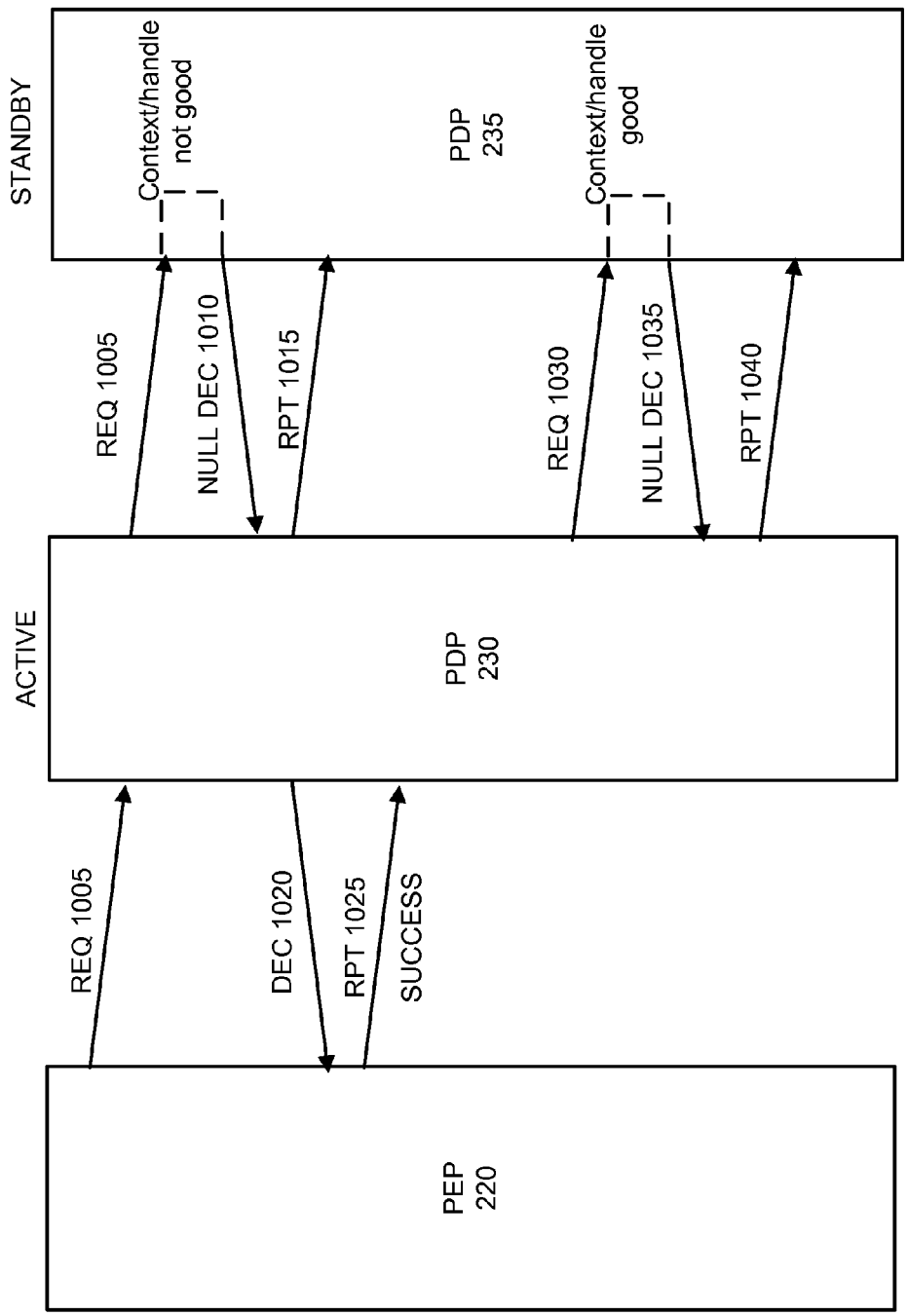
FIG. 10 is a diagram illustrating exemplary message exchanges among a PEP, an active PDP, and a standby PDP for replicating state information of a solicited decision to install policies that may be associated with the concepts described herein.
Figure 11:
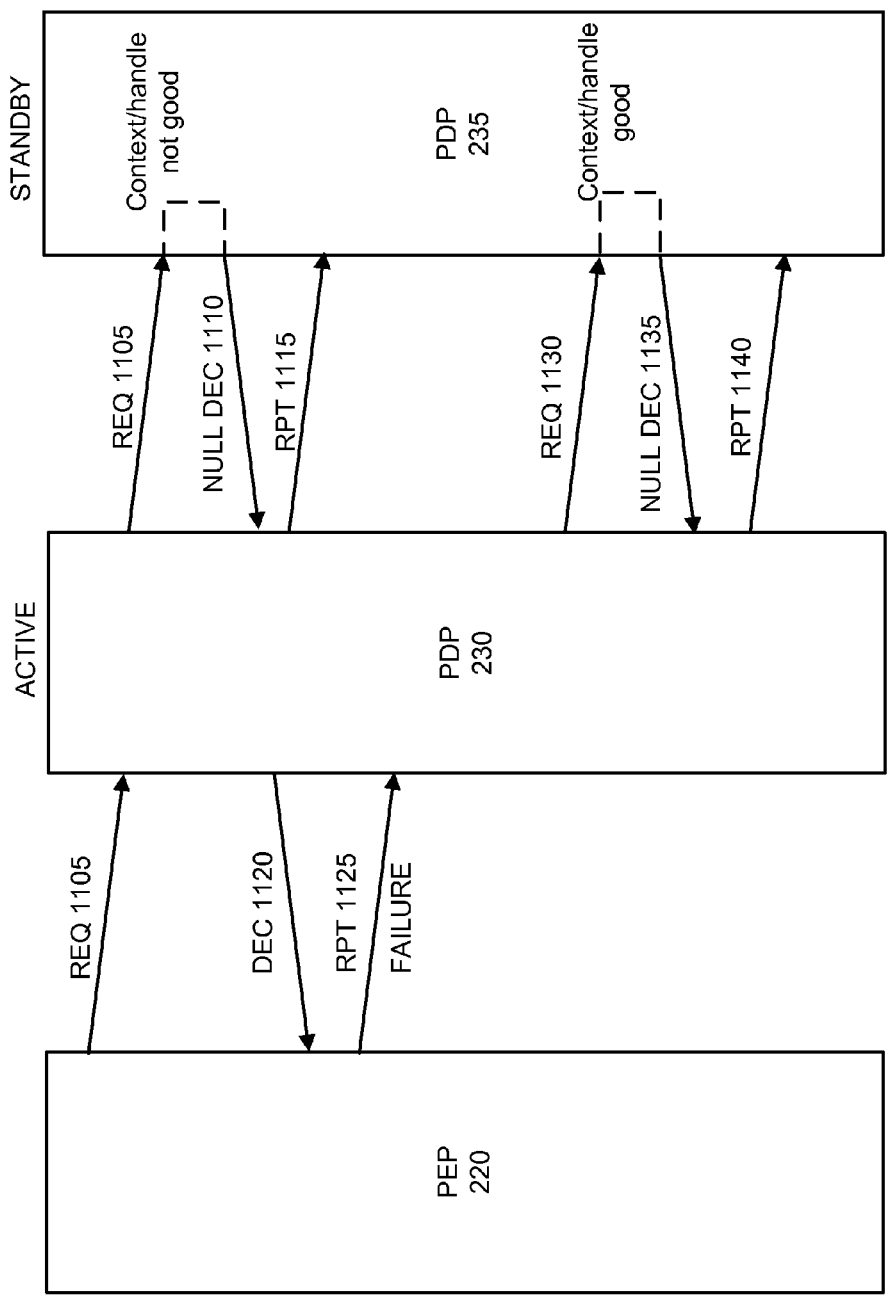
FIG. 11 is a diagram illustrating exemplary message exchanges among a PEP, an active PDP, and a standby PDP for replicating state information of a solicited decision to install policies that may be associated with the concepts described herein.

FIGS. 9, 10, and 11 are diagrams illustrating exemplary message exchanges among PEP 220, PDP 230, and PDP 235 for replicating state information of a solicited decision that may be associated with the concepts described herein. In one example, the issuance of a solicited decision may be a result of responding to a REQ message originating from PEP 220.

Referring to FIG. 9, assume that a connection between PEP 220 and PDP 230 exists, and a connection between PDP 230 and PDP 235 exists. As illustrated, consider the instance if PEP 220 issues a REQ message 905 (e.g., an empty REQ message with no policies) to PDP 230. PDP 235 may issue a corresponding REQ message 905 to PDP 235. PDP 235 may mark (e.g., flag) this client handle as not good since it may be considered as an unknown state. For example, the client handle may relate to an interface/address context. In accordance with the COPS-PR protocol, PDP 230 must respond with a decision message (DEC). However, the decision message may include a decision to install policies or a decision to not install policies on PEP 220. In this instance, since REQ message 905 is an empty REQ, PDP 235 may issue a NULL DEC message 910. In turn, PDP 230 elects not to install policies and may issue NULL DEC message 910 to PEP 220. PDP 230 may respond to NULL DEC message 910 by issuing a RPT message 915 indicating success to PDP 235. PEP 220 may respond with a RPT message 920 indicating success to PDP 230.

Once RPT message 920 is received and PDP 230 recognizes success, PDP 230 may send a REQ message 925 corresponding to NULL DEC message 910 to PDP 235. That is, REQ message 925 may pertain to the same client handle and may not include any policies as did NULL DEC message 910. Upon receiving REQ message 925, PDP 235 may determine that PEP 220 received a NULL DEC message and mark (e.g., flag) the client handle as good. Further, PDP 235 may determine that this particular client handle does not have any policies since REQ message 925 was empty (i.e., with no policies attached). In response to REQ message 925, PDP 235 may issue a NULL DEC message 930, which may serve as an acknowledgement, and PDP 230 may reply with a RPT message 935 indicating success.

In FIG. 10, consider the instance if PEP 220 issues a REQ message 1005 to PDP 230. In turn, PDP 230 may issue a corresponding REQ message 1005 to PDP 235. PDP 235 may mark (e.g., flag) this client handles as not good since it may be considered as an unknown state. PDP 235, in response to REQ message 1005, may issue a NULL DEC message 1010 to PDP 230. PDP 230 may issue a RPT message 1015 in response to NULL DEC message 1010. Additionally, PDP 230 may respond (to REQ message 1005 from PEP 220) with a decision message that includes attachments (e.g., policies to install on PEP 220). That is, PDP 230 may issue a DEC message 1020 to PEP 220.

In this instance, PEP 220 may respond with a RPT message indicating success or failure. If PEP 220 responds with a RPT message 1025 indicating success, then PDP 230 may issue a REQ message 1030 corresponding to DEC message 1020 (i.e., relates to same client handle and includes policies). Upon receiving REQ message 1030, PDP 235 may determine that PEP 220 received a DEC message and mark (e.g., flag) the client handle as good. Further, PDP 235 may recognize that this client handle includes policies since REQ message 1030 contained policies. In response to REQ message 1030, PDP 235 may issue a NULL DEC message 1035, which may serve as an acknowledgement, and PDP 230 may reply with a RPT message 1040 indicating success.

In FIG. 11, consider the instance if PEP 220 issues a REQ message 1105 and PDP 230 issues a DEC message 1120 that includes policies. However, PEP 220 may respond with a RPT message 1125 indicating failure. That is, as previously described above in relation to FIG. 10, PEP 220 may issue a REQ message 1105. PDP 230 may issue a corresponding REQ message 1105 to PDP 235. PDP 235 may mark the context as not good and may issue a NULL DEC message 1110 to PDP 230. In response, PDP 230 may issue a RPT message 1115.

PDP 230 may issue DEC message 1120 that include polices to PEP 220; however, PEP 220 may respond with RPT message 1125 indicating failure. Upon receiving the failure message, PDP 230 may issue a REQ message 1130 that corresponds to a NULL DEC message. That is, REQ message 1120 may include the same client handle, but will not contain the policies of DEC message 1120 since RPT message 1125 indicated a failure. Similar to that previously illustrated and described with respect to FIG. 9, upon receiving REQ message 1130, PDP 235 may determine that this client handle does not include policies. Additionally, PDP 235 may mark this client handle as good. In response to REQ message 1130, PDP 235 may issue a NULL DEC message 1135, which may serve as an acknowledgement, and PDP 230 may reply with a RPT message 1140 indicating success.

As previously described in reference to FIG. 8, if PDP 235 should become the active PDP, and FSS is performed, each context/handle marked as not good may be handled with a REPAIR DEC message. Although FIGS. 9, 10, and 11 illustrate exemplary processes, in other implementations, fewer, additional, or different operations may be performed.

Replication of Unsolicited DECs

As briefly described above, PDP 230 may retrieve policy information from a Policy Information Base (PIB), translate the retrieved policy information into policies, and provide the policies to PEP 220. For example, in an exemplary data structure representing the PIB, such as a tree structure, a provisioning class (PRC) may correspond to a branch and a provisioning instance (PRI) may correspond to a leaf. A PRI may be identified by a provisioning instance identifier (PRID). For example, a PRID may be included in a COPS-PR <Named ClientSJ> or <Named Decision Data> object to identify a particular instance of a class.

Unsolicited DECs to Install Policies

Figure 12:
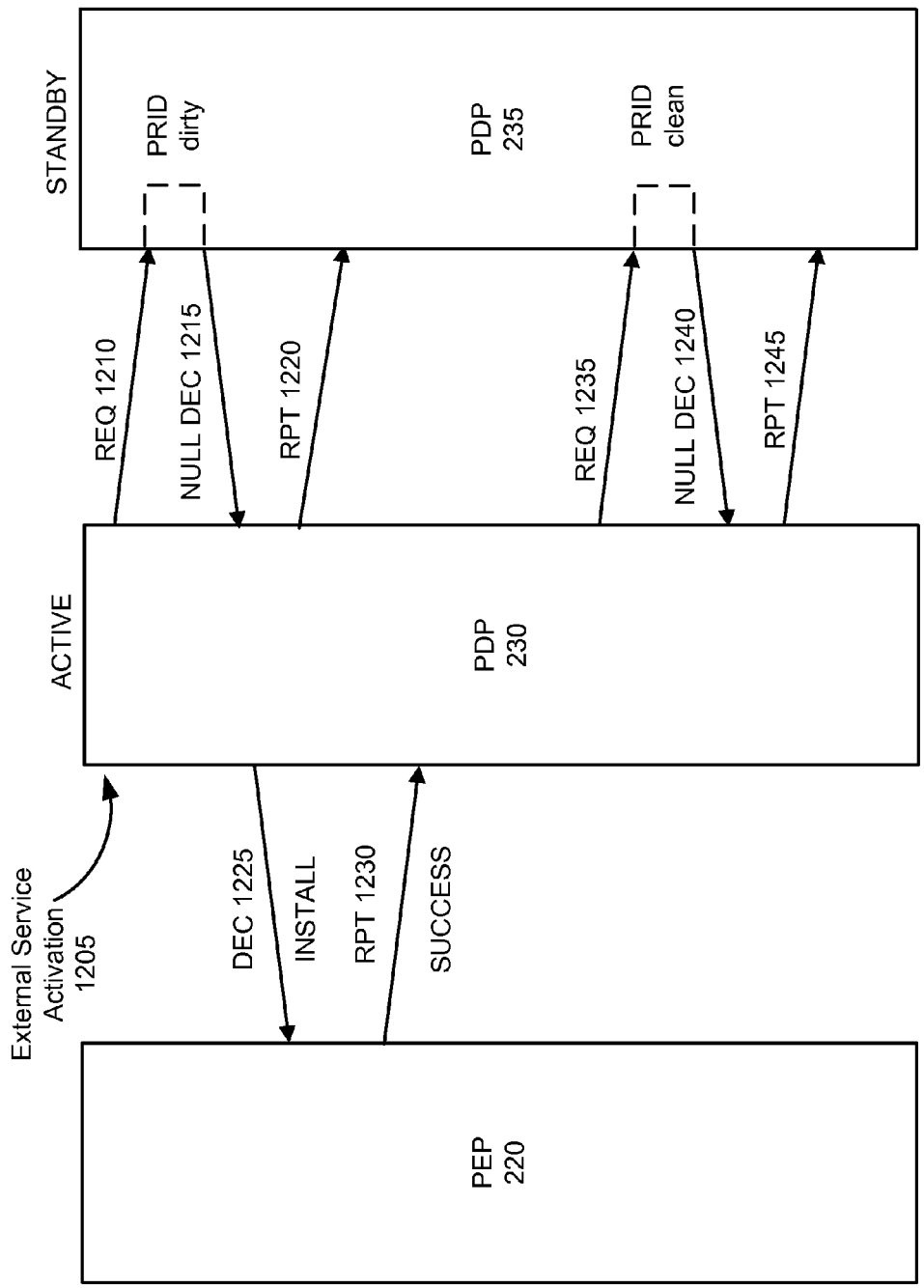
FIG. 12 is a diagram illustrating exemplary message exchanges among a PEP, an active PDP, and a standby PDP for replicating state information of an unsolicited decision to install policies that may be associated with the concepts described herein.

FIG. 12 is a diagram illustrating exemplary message exchanges among PEP 220, PDP 230, and PDP 235 for replicating state information of an unsolicited decision to install policies that may be associated with the concepts described herein. An unsolicited decision may relate to a decision message that originates from an active PDP, such as PDP 230, and is not in response to a REQ message. However, the policies of the decision message are to be installed on the PEP, such as PEP 220.

As illustrated, consider the instance if an external service activation event 1205 occurs. For example, a device (e.g., a set-top box of a subscriber) may send service activation event 1205 to PDP 230. Service activation event 1205 may provide that policies need to be installed on PEP 220. Based on service activation event 1205, PDP 230 may recognize that this corresponds to an unsolicited decision and compute which policies need to be installed. Thereafter, PDP 230 may issue a REQ message 1210 to PDP 235. REQ message 1210 may include each PRID for the policies that were computed to be installed on PEP 220. REQ message 1210 may include a PRI having a transaction identifier uniquely identifying this message. In one implementation, PDP 235 may identify each PRI as a dirty PRI. Each dirty PRI may have associated therewith a PRID, information relating to whether this is an install or an uninstall, and a transaction identifier.

Upon receipt of REQ 1210, PDP 235 may mark the PRIDs as, for example, dirty, record the transaction identifier, and issue a NULL DEC message 1215. Once PDP 230 receives NULL DEC message 1215, PDP 230 may issue a RPT message 1220 indicating success. PDP 230 may also issue a DEC message 1225 that includes the policies to be installed on PEP 220. PEP 220 may respond with a RPT message 1230 indicating success.

Once PDP 230 receives RPT message 1230 indicating success, PDP 230 may issue a REQ message 1235. REQ message 1235 may include the policies installed on PEP 220 and the transaction identifier. Since the policies were installed on PEP 220, PDP 235 may mark the PRIDs as, for example, clean, and issue a NULL DEC message 1240 to PDP 230. That is, PDP 235 may only mark the PRIDs as clean since it associates the PRIDs via the transaction identifier. PDP 230 may send a RPT message 1245 indicating success to PDP 235.

Figure 13:
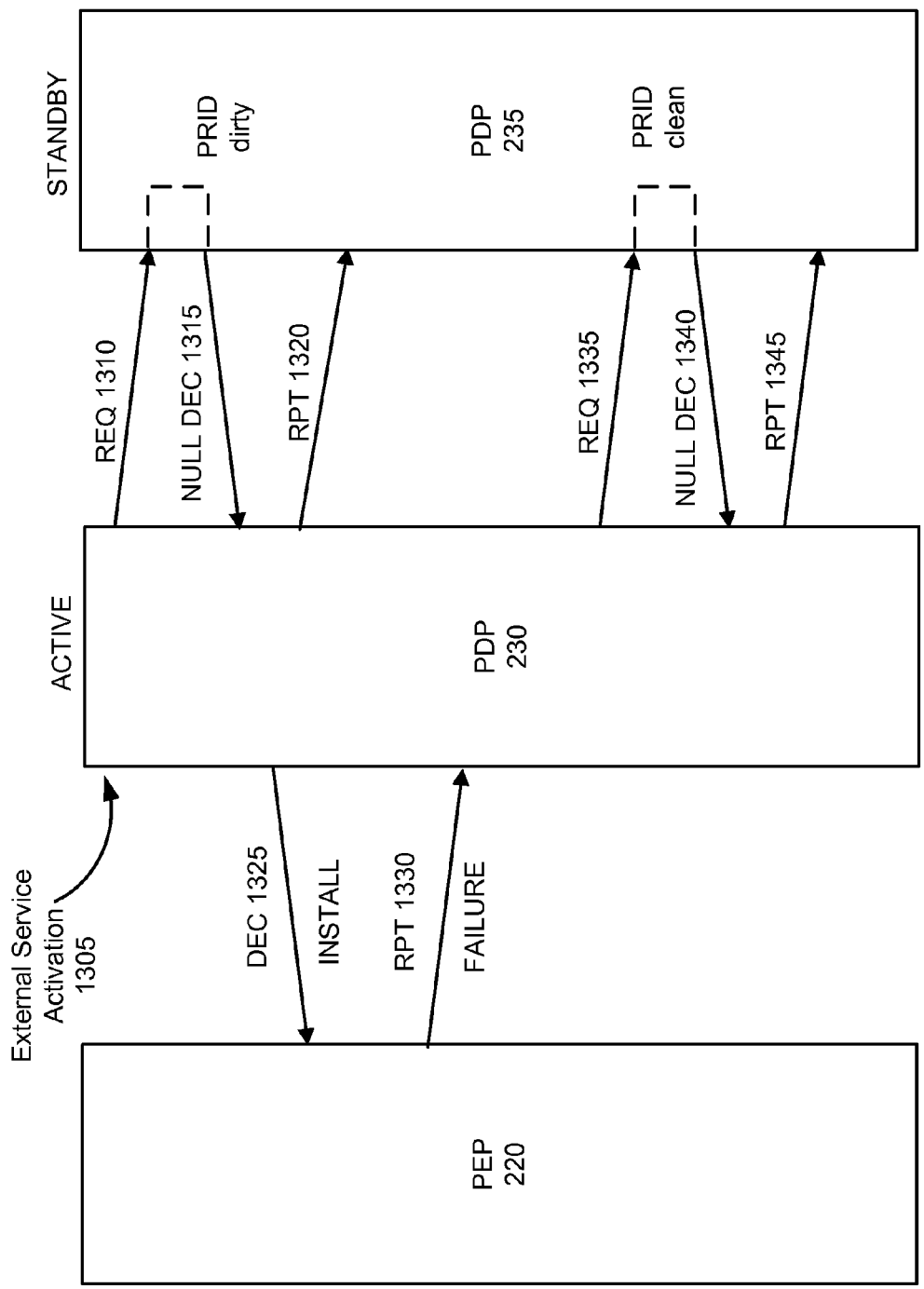
FIG. 13 is a diagram illustrating exemplary message exchanges among a PEP, an active PDP, and a standby PDP for replicating state information of an unsolicited decision to install policies that may be associated with the concepts described herein.

FIG. 13 relates to occurrences similar to those previously described with respect to FIG. 12. However, in FIG. 13, the RPT message from PEP 220 (i.e., a RPT message 1330) indicates a failure, instead of a success. That is, briefly, PDP 230 may receive an external service activation event 1305, compute the policies to be installed on PEP 220, and issue a REQ message 1310. PDP 235 may mark the PRIDs as dirty and issue a NULL DEC message 1315 to PDP 230. Additionally, PDP 230 may issue a RPT message 1320 indicating success. In turn, PDP 230 may send a DEC message 1325 with the policies to PEP 220. However, PEP 220 may issue a RPT message 1330 indicating failure.

Thus, in contradistinction to that previously illustrated and described with respect to FIG. 12, PDP 230 may issue a REQ message 1335. REQ message 1335 may not include the policies, but only the transaction identifier. PDP 235 may mark the PRIDs as clean (since there were no policies installed on PEP 220), and issue a NULL DEC message 1340 to PDP 230. Thereafter, PDP 230 may issue a RPT message 1345 indicating success.

Unsolicited DECs to Uninstall Policies

Figure 14:
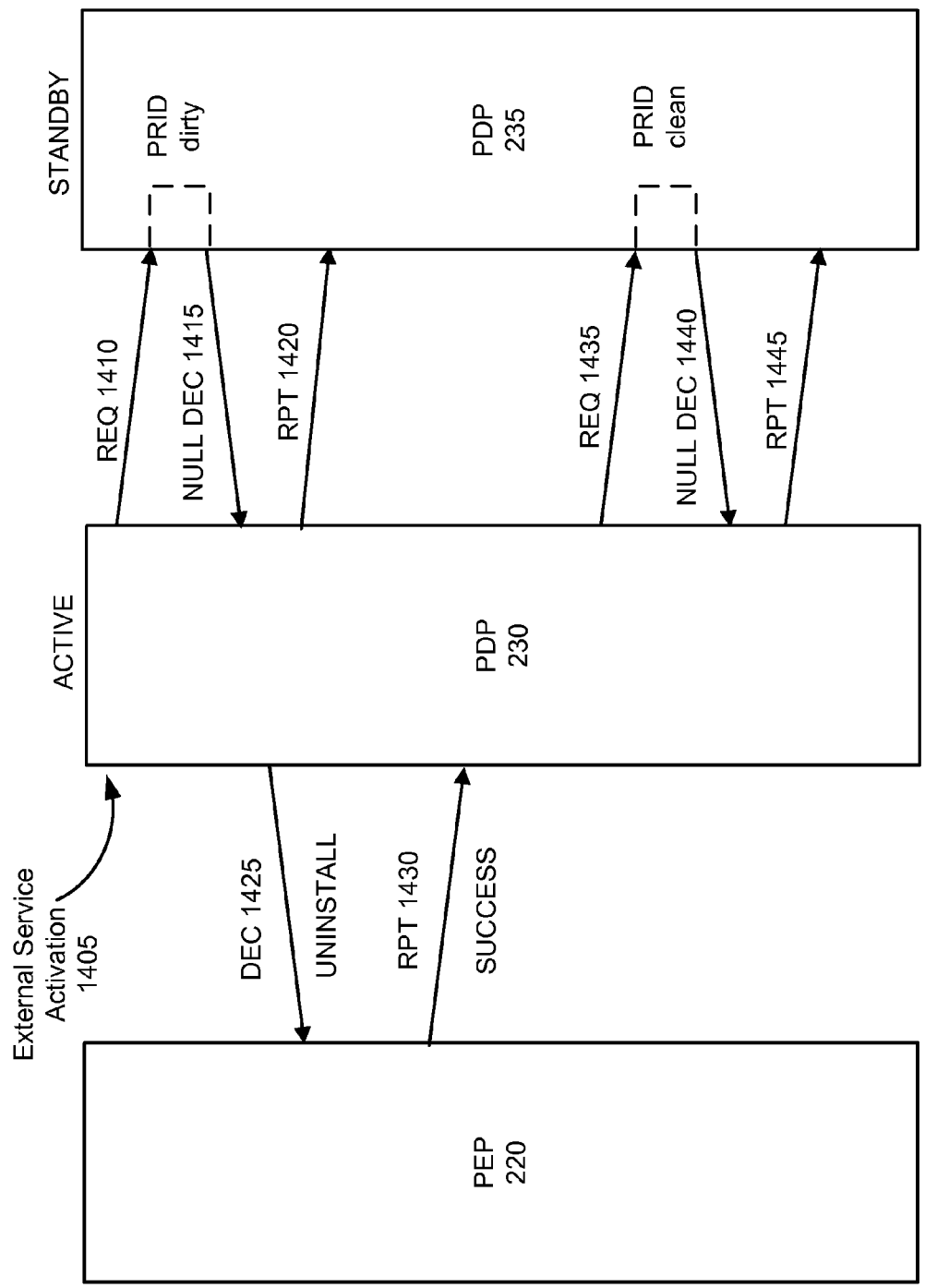
FIG. 14 is a diagram illustrating exemplary message exchanges among a router, an active PDP, and a standby PDP for replicating state information of an unsolicited decision to uninstall policies that may be associated with the concepts described herein.
Figure 15:
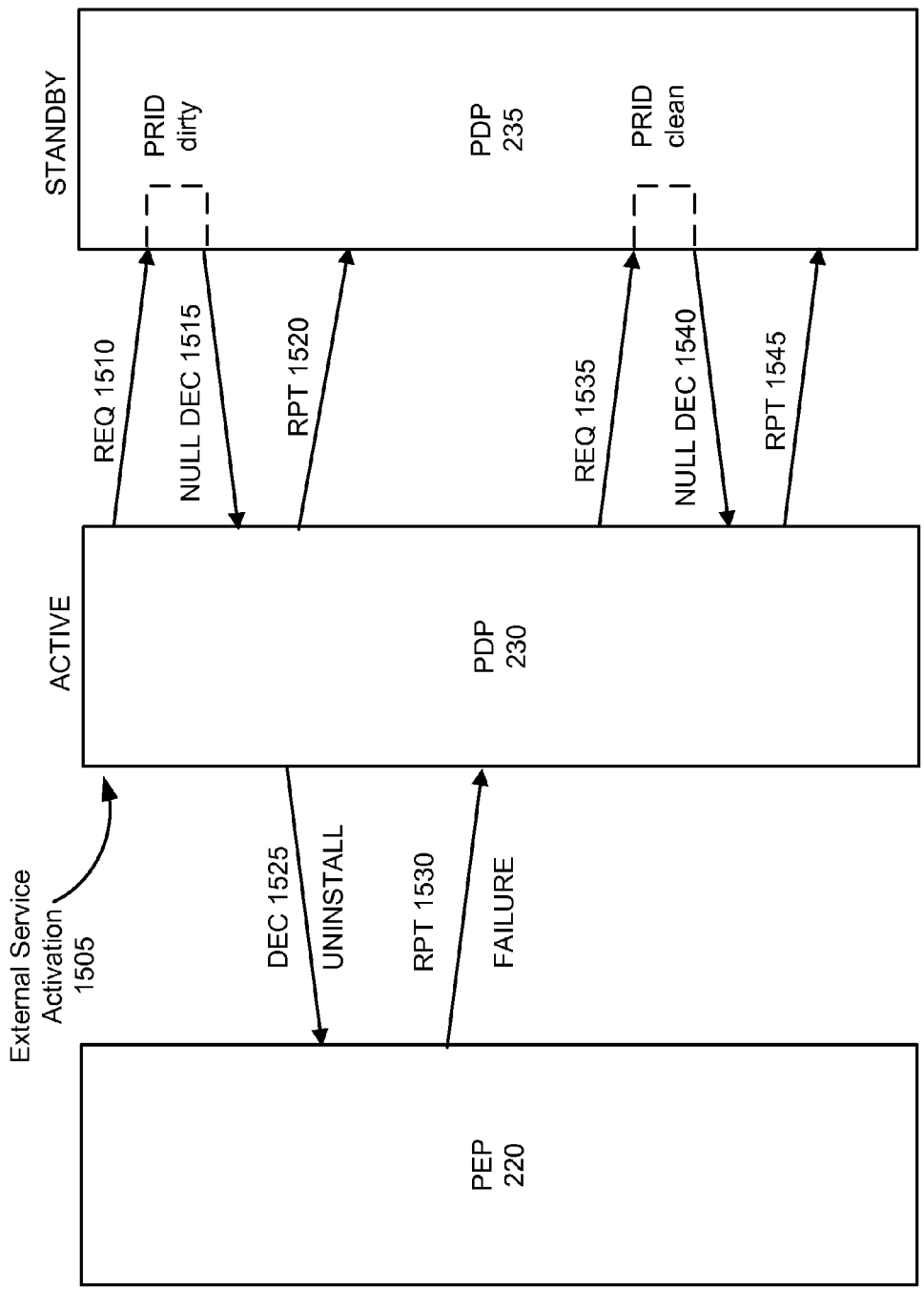
FIG. 15 is a diagram illustrating exemplary message exchanges among a router, an active PDP, and a standby PDP for replicating state information of an unsolicited decision to uninstall policies that may be associated with the concepts described herein.

FIGS. 14 and 15 relate to similar circumstances to those previously described in relation to FIGS. 12 and 13, except the unsolicited decision messages relate to uninstalling (or removing) policies, instead of installing policies (or adding) policies on PEP 220.

Referring to FIG. 14, PDP 230 may receive an external service activation event 1405. In response, PDP 230 may compute the policies to be removed, and issue a REQ message 1410. That is, REQ message 1410 may be analogous to REQ 1210 in that it may contain dirty PRID PRIs and the transaction identifier PRI. PDP 235 may mark the PRIDs as, for example, dirty, and issue a NULL DEC message 1415 to PDP 230. Additionally, PDP 230 may issue a RPT message 1420 indicating success and may send a DEC message 1425 indicating the policies to be removed to PEP 220. PEP 220 may respond with a RPT message 1430 indicating success.

Once PDP 230 receives RPT message 1430 indicating success, PDP 230 may issue a REQ message 1435. REQ message 1435 may include PRIs identifying the policies uninstalled on PEP 220 and the transaction identifier. Since the policies were uninstalled on PEP 220, PDP 235 may mark the PRID as, for example, clean, and issue a NULL DEC message 1440 to PDP 230. PDP 230 may send a RPT message 1445 indicating success to PDP 235.

FIG. 15 relates to occurrences similar to those previously described with respect to FIG. 14. However, in FIG. 15, the RPT message from PEP 220 (i.e., a RPT message 1530) indicates a failure, instead of a success. That is, briefly, PDP 230 may receive an external service activation event 1505, compute the policies to be removed on PEP 220, and issue a REQ message 1510. PDP 235 may mark the PRIDs as dirty and issue a NULL DEC message 1515 to PDP 230. Additionally, PDP 230 may issue a RPT message 1520 indicating success and may send a DEC message 1525 indicating the policies to be uninstalled to PEP 220. However, PEP 220 may issue a RPT message 1530 indicating failure.

Thus, in contradistinction to that previously illustrated and described with respect to FIG. 14, PDP 230 may issue a REQ message 1535. REQ message 1535 may not include the policies, but only the transaction identifier. PDP 235 may mark the PRIDs as clean, and issue a NULL DEC message 1540 to PDP 230. Thereafter, PDP 230 may issue a RPT message 1545 indicating success.

As illustrated in FIGS. 7 to 15, state information may be replicated on a standby PDP, such as PDP 235. So, if a connection failure occurs between PEP 220 and (active) PDP 230, FSS may be performed between PEP 220 and (standby) PDP 235. During FSS operations, PDP 235 (the now active PDP) may handle each context/handles marked as not good by issuing a REPAIR DEC message to PEP 220. Additionally, PDP 235 (the active PDP) may handle each unknown state (e.g., PRIs marked dirty, timeouts, etc.) by issuing an ENFORCEMENT DEC message to PEP 220.

CONCLUSION

The foregoing description of implementations provides an illustration, but is not intended to be exhaustive or to limit the implementations to the precise form disclosed. Modifications and variations are possible in light of the above teachings or may be acquired from practice of the teachings.

In addition, while series of message exchanges have been described with regard to the processes illustrated in FIGS. 4-15, the order of the messages may be modified in other implementations. Further, non-dependent messages may be issued in parallel.

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

Even though particular combination of features are recited in the claims and/or disclosed in the specification, these combinations are not intended to limit the invention. In fact, many of these features may be combined in ways not specifically recited in the claims and/or disclosed in the specification.

No element, block, or instruction used in the present application should be construed as critical or essential to the implementations described herein unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   detecting, by a Policy Enforcement Point (PEP), a failure of a connection
   establishing, by the PEP, another connection with a Policy Decision Point (PDP) after detecting the failure of the connection;
   sending, by the PEP, a client-open message, of a common open policy service for policy provisioning (COPS-PR) protocol, to the PDP,
      the client-open message including:
         an Internet Protocol (IP) address of a last PDP associated with the PEP, and
         a port number of the last PDP,
      the client-open message being sent after establishing the other connection;
   receiving, by the PEP and based on sending the client-open message, a message from the PDP,
      the message indicating an acceptance of the client-open message;
   receiving, by the PEP and from the PDP, a null decision message of the COPS-PR protocol,
      the null decision message indicating that a fast state synchronization is to be performed,
      the null decision message being received when the PDP determines that the fast state synchronization is to be performed based on:
         the PDP determining that the IP address of the last PDP and the port number of the last PDP match an IP address of the PDP and a port number of the PDP, or
         the PDP determining that:
            the IP address of the last PDP does not match the IP address of the PDP,
            the PDP includes state information of the last PDP, the PDP being a backup of the last PDP, and
            the IP address of the last PDP, included in the client-open message, corresponds to an IP address of the last PDP associated with the state information of the last PDP;
   sending, by the PEP, a message indicating an approval to perform the fast state synchronization when the null decision message is received;
   initiating, by the PEP, the fast state synchronization based on sending the message indicating the approval of the fast state synchronization; and
   initiating, by the PEP, a full state synchronization when the PDP issues a message to request the full state synchronization.

2. The method of claim 1, further comprising:
   storing, by the PEP, a delete request message, of the COPS-PR protocol, before the failure of the connection occurs; and
   determining, by the PEP, whether the delete request message is received by the PDP based on a decision message of the COPS-PR protocol.

3. The method of claim 2, where determining whether the delete request message is received comprises:

issuing, by the PEP, a request for a configuration message, of the COPS-PR protocol, subsequent to the delete request message being stored;
receiving, by the PEP, the decision message corresponding to the request for configuration message before the failure of the connection; and
determining that the delete request message was received by the PDP based on receiving the decision message corresponding to the request for configuration message.

4. The method of claim 1, further comprising:
receiving, from the PDP, a decision message of the COPS-PR protocol before the failure of the connection, where the decision message relates to a shared context; and
issuing, by the PEP, a report message of the COPS-PR protocol corresponding to the decision message when the failure of the connection occurs.

5. The method of claim 4, further comprising:
receiving, from the PDP, an enforcement decision message, of the COPS-PR protocol, corresponding to the decision message after establishing the other connection,
where the enforcement decision message directs the PEP to perform operations different than operations identified by the decision message.

6. A device comprising:
a memory to store one or more instructions; and
a processor that executes the one or more instructions to:
  establish a connection with a Policy Decision Point (PDP) after a connection failure;
  transmit, to the PDP after establishing the connection, a client-open message of a common open policy service for policy provisioning (COPS-PR) protocol,
    the client-open message including:
      an address of a last PDP associated with the device, and
      a port number of the last PDP;
  receive a null decision message of the COPS-PR protocol from the PDP,
    the null decision message indicating that a fast state synchronization is to be performed,
    the null decision message being received when the PDP determines the fast state synchronization is to be performed based on:
      the PDP determining that the address of the last PDP and the port number of the last PDP, included in the client-open message, match an address of the PDP and a port number of the PDP, or
      the PDP determining that:
        the IP address of the last PDP does not match the IP address of the PDP,
        the PDP includes state information of the last PDP and the PDP being a backup of the last PDP, and
        the IP address of the last PDP, included in the client-open message, corresponds to an IP address, of the last PDP, associated with the state information of the last PDP;
  send a message indicating an approval to perform the fast state synchronization based on receiving the null decision message;
  initiate the fast state synchronization after sending the message indicating the approval to perform the fast state synchronization; and
  initiate a full state synchronization when the PDP issues a message to request the full state synchronization.

7. The device of claim 6, where the processor further executes one or more instructions to:
transmit differential state information to the PDP based on receiving the null decision message,
where the differential state information includes at least one of a request for configuration message of the COPS-PR protocol or a delete request state message of the COPS-PR protocol, and
where the differential state information is stored by the device before the connection failure.

8. The device of claim 6, where the processor further executes one or more instructions to receive one or more messages after transmitting the client-open message,
the one or more messages including a client-accept message of the COPS-PR protocol indicating an acceptance of the client-open message.

9. The device of claim 6, where the processor further executes one or more instructions to:
transmit a delete request state message of the COPS-PR protocol to the PDP before the connection failure;
store the delete request state message in the memory before the connection failure;
transmit a request for a configuration message of the COPS-PR protocol to the PDP before the connection failure; and
erase the delete request state message from the memory if a decision message of the COPS-PR protocol, corresponding to the request for the configuration message, is received from the PDP before the connection failure.

10. The device of claim 9, where the processor further executes one or more instructions to:
transmit the delete request state message to the PDP when the decision message of the COPS-PR protocol corresponding to the request for configuration message is not received from the PDP before the connection failure.

11. A device comprising:
a memory to store one or more instructions; and
a processor that executes the one or more instructions to:
  establish a connection with a Policy Enforcement Point (PEP) after a connection failure;
  receive, from the PEP, a client-open message of a common open policy service for policy provisioning (COPS-PR) protocol,
    the client-open message including:
      an address of a last Policy Decision Point (PDP) associated with the PEP prior to establishing the connection, and
      information identifying a port of the last PDP;
  send, based on receiving the client-open message, a message indicating an acceptance of the client-open message;
  determine whether a fast state synchronization or a full state synchronization is to be performed,
    when determining whether the fast state synchronization or the full state synchronization is to be performed, the processor is to determine:
      whether:
        the address of the last PDP matches an address of the device, and
        the information identifying the port of the last PDP matches information identifying a port of the device, or
      whether:
        the device includes state information of the last PDP, and the address of the last PDP, included in the client-open message, corresponds to an address, of the last PDP, associated with the state information of the last PDP, transmit, to the PEP, a message to request the full state synchronization when the full state synchronization is to be performed, transmit a null decision message of the COPS-PR protocol, to the PEP,
when the fast state synchronization is to be performed,
the null decision instructing the PEP to perform the fast state synchronization,
the null decision message being transmitted:
when:
the address of the last PDP matches the address of the device, and
the information identifying the port of the last PDP matches the information identifying the port of the device, or
when:
the address of the last PDP does not match the address of the device,
the device includes state information of the last PDP and the device is a backup of the last PDP, and
the address of the last PDP, included in the client-open message, corresponds to an address, of the last PDP, associated with the state information of the last PDP,
and
receive, from the PEP, a message indicating an approval to perform the fast state synchronization based on transmitting the null decision message instructing the PEP to perform the fast state synchronization.

12. The device of claim 11, where the processor further executes one or more instructions to:
issue a decision message of the COPS-PR protocol to the PEP before the connection failure; and
determine that a report message of the COPS-PR protocol, corresponding to the decision message, was not received from the PEP.

13. The device of claim 12, where the processor further executes one or more instructions to:
issue an enforcement decision message during the connection to the PEP,
the enforcement decision message instructing the PEP to undo an operation identified by the decision message.

14. The device of claim 12, where the processor further executes one or more instructions to:
issue a repair decision during the connection to the PEP,
the repair decision including a command to erase state information associated with the PEP,
the state information, associated with the PEP, being associated with at least one of an interface associated with the PEP or an address associated with the PEP.

15. A non-transitory memory device storing instructions, the instructions comprising:
one or more instructions which, when executed by at least one processor of a Policy Enforcement Point (PEP), cause the at least one processor to:
establish a connection with a Policy Decision Point (PDP) when the PEP experiences a connection failure;
transmit, to the PDP after establishing the connection, a client-open message of a common open policy service for policy provisioning (COPS-PR) protocol,
the client-open message including:
an address of a last PDP associated with the PEP, and
a port number of the last PDP;
receive, from the PDP after transmitting the client-open message, a null decision message of the COPS-PR protocol,
the null decision message indicating that a fast state synchronization is to be performed,
the null decision message being received when the PDP determines that the fast state synchronization is to be performed based on:
the PDP determining that:
the address of the last PDP matches an address of the PDP, and
the port number of the last PDP matches a port number of the PDP, or
the PDP determining that:
the IP address of the last PDP does not match the IP address of the PDP,
the PDP includes state information of the last PDP and the PDP is a backup of the last PDP, and
the IP address of the last PDP, included in the client-open message, corresponds to an IP address, of the last PDP, associated with the state information of the last PDP;
send a message indicating an approval to perform the fast state synchronization when the null decision message is received;
initiate the fast state synchronization based on sending the message indicating the approval to perform the fast state synchronization; and
initiate a full state synchronization when the PDP issues a message to request the full state synchronization.

16. The non-transitory memory device of claim 15, where the address of the last PDP corresponds to an Internet Protocol (IP) address of the last PDP, and
where the address of the PDP corresponds to an IP address of the PDP.

17. The non-transitory memory device of claim 15, the instructions further comprising:
one or more instructions which, when executed by the at least one processor, cause the at least one processor to receive, based on sending the client-open message and from the PDP, a message indicating an acceptance of the client-open message.

18. A method comprising:
establishing, by a Policy Decision Point (PDP), a connection with a Policy Enforcement Point (PEP) after a connection failure;
receiving, by the PDP and from the PEP, a client-open message of a common open policy service for policy provisioning (COPS-PR) protocol,
the client-open message including:
an address of a last PDP associated with the PEP prior to establishing the connection, and information identifying a port of the last PDP;
sending, by the PDP and based on receiving the client-open message, a message indicating an acceptance of the client-open message;
determining, by the PDP, whether a fast state synchronization or a full state synchronization is to be performed, determining whether the fast state synchronization or the full state synchronization is to be performed including:
  determining whether:
    the address of the last PDP matches an address of the PDP, and
    the information identifying the port of the last PDP matches information identifying a port of the PDP, or
  determining whether:
    the address of the last PDP does not match the address of the PDP,
    the PDP includes state information of the last PDP and the PDP is a backup of the last PDP, and
    the address of the last PDP, included in the client-open message, corresponds to an address, of the last PDP, associated with the state information of the last PDP;
transmitting, by the PDP and to the PEP, a message to request the full state synchronization when the full state synchronization is to be performed;
transmitting, by the PDP and to the PEP, a null decision message of the COPS-PR protocol when the fast state synchronization is to be performed,
  the null decision message instructing the PEP to perform the fast state synchronization,
  the null decision message being transmitted:
    when:
      the address of the last PDP matches the address of the PDP, and
      the information identifying the port of the last PDP matches the information identifying the port of the PDP, or
    when:
      the address of the last PDP does not match the address of the PDP,
      the PDP includes state information of the last PDP and the PDP is a backup of the last PDP, and
      the address of the last PDP, included in the client-open message, corresponds to an address, of the last PDP, associated with the state information of the last PDP; and
receiving, by the PDP and from the PEP, a message indicating an approval to perform the fast state synchronization based on transmitting the null decision message instructing the PEP to perform the fast state synchronization.

19. The method of claim 18, further comprising:
transmitting a decision message of the COPS-PR protocol to the PEP before the connection failure; and
determining that a report message of the COPS-PR protocol, corresponding to the decision message, was not received from the PEP.

20. The method of claim 19, further comprising:
transmitting an enforcement decision message during the connection,
the enforcement decision message instructing the PEP to undo an operation identified by the decision message.

* * * * *